(12) United States Patent
Delis et al.

(10) Patent No.: US 8,658,254 B2
(45) Date of Patent: Feb. 25, 2014

(54) METHOD OF COATING SUBSTRATES

(75) Inventors: Johannes Gerardus Petrus Delis, NJ Bergen op (NL); John Huggins, Leverkusen (DE); Veronika Ötschmann, Leverkusen (DE); Jörg-Walter Hermann, Cologne (DE)

(73) Assignee: Momentive Performance Materials GmbH, Leverkusen (DE)

( * ) Notice: Subject to any disclaimer, the term of this patent is extended or adjusted under 35 U.S.C. 154(b) by 164 days.

(21) Appl. No.: 13/054,510

(22) PCT Filed: Jul. 16, 2009

(86) PCT No.: PCT/EP2009/059121
§ 371 (c)(1),
(2), (4) Date: Jan. 17, 2011

(87) PCT Pub. No.: WO2010/010030
PCT Pub. Date: Jan. 28, 2010

(65) Prior Publication Data
US 2011/0124804 A1 May 26, 2011

(30) Foreign Application Priority Data
Jul. 19, 2008 (EP) .................................... 08013065

(51) Int. Cl.
*B32B 9/04* (2006.01)
(52) U.S. Cl.
USPC .......................................... 427/387; 524/588

(58) Field of Classification Search
USPC ........................................... 427/387; 524/588
See application file for complete search history.

(56) References Cited

U.S. PATENT DOCUMENTS

| 5,399,402 | A  | * | 3/1995  | Inoue et al. ................... 428/35.7 |
| 5,968,660 | A  |   | 10/1999 | Armstrong et al. |
| 5,998,536 | A  | * | 12/1999 | Bertry et al. .................. 524/557 |
| 6,387,452 | B1 |   | 5/2002  | Benayoun et al. |
| 6,822,021 | B1 | * | 11/2004 | Kim et al. ....................... 523/216 |
| 8,227,520 | B2 | * | 7/2012  | Shirasaki et al. ................ 521/65 |
| 2003/0149166 | A1 | * | 8/2003 | Duffy et al. .................... 524/588 |

FOREIGN PATENT DOCUMENTS

DE  19934438 A1  1/2001
WO  02/42360 A2  5/2002

OTHER PUBLICATIONS

International Preliminary Report on Patentability for corresponding PCT/EP2009/059121 issued Jan. 25, 2011, five pages.
International Search Report for corresponding PCT/EP2009/059121 mailed Sep. 3, 2009, 8 pages.
Communication Pursuant to Rule 114(2) EPC, Application No. 09780682.2, dated Dec. 20, 2013, 6 pages.

* cited by examiner

*Primary Examiner* — Margaret Moore
(74) *Attorney, Agent, or Firm* — Rankin, Hill & Clark LLP

(57) ABSTRACT

The invention relates to a new method of coating substrates with an aqueous emulsion of a reactive silicone-based composition and a method of preparing said aqueous emulsion of said reactive silicone-based composition.

12 Claims, 4 Drawing Sheets

Doctor Blade Chamber

3 Roll Coater and nip feeder

Reverse Gravure Coating in a Foulard process

METHOD OF COATING SUBSTRATES

The present invention relates to a new method of coating substrates with an aqueous emulsion of a reactive silicone-based composition and a method of preparing said aqueous emulsion of said reactive silicone-based composition. The invention is related, in particular, to a new process for making emulsions in-line with the coating process and its use to form coatings on sheet-like substrates, such as fiber-like substrates, like paper, and plastic films, as well as to coated substrates manufactured with this process.

Silicone-based release coatings are designed to provide a layer on a carrier substrate, which allows separating a third tacky layer. Such tacky or adhesion layer can include e.g. pressure sensitive adhesives as adherent layer for labels and the like. The silicone layer should not diffuse into the adhesion layer but should be fixed to the carrier substrate as best as possible. Another requirement may be the chemical repellency against chemical compounds used in the adhesion layer in order to maintain constant release properties over longer times. Today the majority of silicone paper release coating compositions are so-called solvent-less systems. Such systems include silicone compositions, which are curable by a condensation reaction; a hydrosilylation reaction as well as light activated curing reactions using several mechanisms. Preferred systems do not contain solvents. Solvents may be added, for example to modify the viscosity of the system, if appropriate and not prohibited by safety or other regulations. Adjusting the viscosity in this way may influence the surface coverage and the penetration of the reactive system into the surface of the substrate.

Another way to apply reactive silicone-based release coatings is the use of emulsified silicone components. Due to the high reactivity of such systems the single components are separated in at least 2 emulsified compositions in order to form a reactive emulsion, which will cure not before these multiple emulsified silicone components are mixed and applied on the substrate.

The emulsified silicone systems curable by hydrosilylation use preferably water as the continuous phase. The technical advantage of emulsified silicones curable after mixing is a good penetration of porous, open papers like parchment papers e.g. for bakery applications, and in some cases the option of being miscible with other emulsions like acrylic or SBR-based emulsions (for reasons of cost reduction).

Still another reason to use water-based emulsions is to enable the application of such silicone compositions with established or available simple application systems like size presses or off-set gravure roller systems. Solvent-less systems can only be effectively applied using more expensive 5-roll applicators or the equivalent and as a rule require the use of more expensive closed-pore substrates, such as glassine papers.

Water based fast curing emulsions for silicone release coatings according to the state of the art are generally thermally curing systems based on mixtures of alkenylsiloxane polymers, hydrogensiloxane crosslinkers, catalysts, inhibitors and additives. The emulsions are prepared by dispersing a mixture of components in water under the influence of a shear force, whereby emulsifiers are used to stabilize the emulsions.

In order to obtain sufficient storage stability and thus allowing for preparation of the emulsions at one site (the silicone supplier) and use of the emulsions at another (the paper coater), these materials are usually supplied as a two-part-emulsion system. The first emulsion contains vinylsiloxanes, the catalyst and additives, whereas the second emulsion contains the hydrogensiloxanes and additional vinylsiloxanes and/or additives. In this way the catalyst is separate from the crosslinking hydrogensiloxanes, providing for storage and transport stable emulsions. These two emulsions are then mixed shortly before use and if need be diluted with additional water. The stability, termed bath-life, required of the mixed emulsions is thus only that needed for convenient handling at the coater. Typically the bath-life time is required more than 0.5 h, preferable more than 3 hours.

This two-part-emulsion system according to state of the art has several disadvantages.

First, the requirements for coated substrates include on the one hand a sufficient coating performance on a carrier substrate and on the other hand a high cure rate, as well as a storage stability of the two-part-emulsion as supplied. These technical process parameters should be constant and reproducible, because they have a direct impact on the coating quality. One of the most critical parameters is the molar vinylsiloxane to hydrogensiloxane ratio. Under storage of the emulsions one can observe a loss of reactive groups such as SiH groups when such hydrogensiloxanes are dispersed in water and stored over 7-100 days or more.

If this ratio of the present hydrogensiloxane is too small, then curing will not be complete, impacting the release properties and adhesion of the coating to the substrate. It is well know that emulsions of hydrogensiloxanes are of only limited stability. Reaction of the Si—H groups with water can lead to hydrogen gas formation and loss of the reactive Si—H groups. This loss of reactive groups has a direct impact on the coating performance. The teaching of state of the art is to add an excess of hydrogensiloxanes in the starting composition, but this leads to a variable vinylsiloxane to hydrogensiloxane ratio during the coating process, depending on storage conditions, because the loss of SiH is not predictable. Therefore there is still a need for a composition and/or a technology, which can provide consistent coating layers showing good release properties, low rubb-off and low smear properties.

Second, in manufacture of the storage stable emulsions for silicone release coatings control of the particle size is critical. This requires the use of expensive high shear equipment such as colloid mills or homogenizers and careful control of the process parameters. As a rule the shear force must be introduced in such a way as to achieve an average particle size for the emulsions of less than 1 micron ($\mu m$). This complex process and equipment adds unneeded cost.

Third, since the silicone polymers, crosslinkers, inhibitors and catalysts used in the two emulsions are already fixed in terms of types and its content. The ratio of these components to each other can only be realized in a narrow range varying the weight ratio of the two emulsions. This limits the range of coating properties that can be obtained with a given set of emulsions. Therefore there is still a need for greater flexibility in the formulation of silicone-based release coating emulsions.

Fourth, the state of the art two-emulsion systems require the shipping of large amounts of water, increasing transportation costs. Also, since freezing can damage these emulsions, the transport and storage must be under frost-free conditions using heated trucks and containers, which adds additional cost.

U.S. Pat. No. 4,791,029 (Fau), U.S. Pat. No. 3,900,617 (Grenoble), GB 1,541,801 (Hockemeyer of Wacker) describe recipies for emulsions for paper release applications and the advantages of the two-component emulsion system described above. Preferred emulsifiers are in all cases polymeric polyvinyl alcohols or alkyl ethers of polyethylene glycols, or mixtures thereof. EP 0385342 (Bunge) and U.S. Pat. No.

5,777,017 (Funk and Kuermeier) disclose the use of different polyvinyl alcohols polymers as stabilizing agent for emulsions, whereby the type of the emulsifier determines the droplet size. The patent discloses a polyvinyl alcohol (II) having a higher degree of hydrolysis, which results in a bigger droplet size. Kuermeier teaches also to separate the potentially reactive compounds into two emulsions.

EP-A 1044237 (Duffy) and U.S. Pat. No. 5,500,148 (Ohba) try to resolve the problem of storage stability of two-component emulsions. They teach how to stabilize the SiH content of hydrogensiloxanes containing emulsions by controlling the pH-level.

U.S. Pat. No. 4,637,341 discloses how to dilute a concentrated silicone emulsion of un-known composition in a technical scale and how to apply such emulsion onto a substrate. U.S. Pat. No. 6,387,452 teaches how to mix a highly reactive system having a bath-life time below 10 h with premix chambers immediately before the coating process without preparing any emulsified form thereof. In a different attempt the reactive components are cured before coating (U.S. Pat. No. 4,248,751). However, the coatings prepared by such a process have different properties, and are not satisfactory in each aspect. The inventors of that system aimed to a rubbery latex, which does not show comparable appropriate release performance of the resulting coatings.

Nowhere in the prior art, however, it has been described to first prepare a reactive silicone-based composition and then to prepare a reactive emulsion from such reactive composition, presumably because of the general prejudice that if the reactive composition has been once prepared it cannot be handled and transferred into water anymore in view of its reactivity.

Accordingly, today multiple part emulsions comprising separated emulsified reactive components are manufactured in the silicone industry and then shipped to the manufacturers of the coated substrates, where the aqueous emulsions of the single components are unified to form a curable, reactive emulsified composition.

This fashion of shipping water-based emulsions wherein the reactive components are separated as multi-component emulsions is preferred in order to anticipate premature cure or loss of reactivity during transportation or storage. After mixing the separated emulsified components one gets a reactive emulsion, which is usually applied before the end of its bath-life time in the coating process.

The technology of prior art applying such multi-part-component emulsions is schematically shown in FIG. 1.

The step (1) and (2) of this process, i.e. the production of the at least 2 emulsions of such a multiple component (2) and (2') system takes place at the silicone manufacturer.

The step (3) includes transportation and storage of the aqueous emulsion.

The storage buffer tanks (4 and 4"), an additional water tank (4") and the dosage and metering units (5) and mixing unit (6) represent the units for making the reactive emulsions for the coating process including the units (7)-(12).

The symbols (7)-(12) represent the dispenser unit (7) and the coating unit (8), which are selected form the group of individuals apparatuses as described below.

The coated substrate passes the transport rolls (9), which can serve in the same time as heated rolls for drying and curing. The unit (10) represents the optional drying unit, whereby symbol (11) represents the optional curing unit, if the cure could not already be completed in the unit (9).

The function of the unit (12) is to wind-up the coated substrate carrying the cured silicone layer by means of a winding roll.

Since the silicone polymers, crosslinkers, inhibitors and catalysts used in the 2-part-emulsions are already fixed in terms of types and its ratio to each other by the given composition any alteration of the ratio of the two or multiple component emulsions has a direct impact onto the ratio of reactive groups in these compositions and changes immediately the reactivity of the total mixture.

I.e. there is not too much degree of freedom for adjusting e.g. the reactivity, the presence or absence of additives in the coating process at the end-user, who uses today the pre-manufactured emulsions in the coating process. Another major disadvantage is that a huge amount of water has to be shipped over long distances, because the active principle in those aqueous emulsions amounts only to a maximum of about 60 wt.-% generally, more usually round about 40 wt. % solids. A further important disadvantage is that the aqueous emulsions of the single components having reactive groups for a curable silicone composition are subject to severe stability problems, such as the chemical instability of the SiOH- or SiH-groups containing silicone cross-linking component in water and physical stability such as the droplet size of the emulsions and the necessity of a frost-proof storage.

One attempt to overcome these problems could be to deliver the single components to the manufacturer of the coated substrates, who then prepares the multi-component aqueous emulsions for each single component by him and mixes the different aqueous emulsions of the single components before coating to give a reactive emulsion. However such a process does not overcome all disadvantages of the above process, because at least two separate emulsification steps and at least one additional mixing step is required. Also this process requires either additional process control steps to adjust the different emulsification steps and the metering of the aqueous emulsions and/or the process requires additional storage units for the intermediately occurring emulsions.

One might consider as a further attempt to overcome such disadvantages to prepare the aqueous emulsions of the reactive silicone-based compositions by emulsifying all single components of a reactive silicone-based composition in one step with water to prepare the aqueous emulsion. However, it has been found that the aqueous emulsions prepared in such a process exhibit poor reactivity and also the reproducibility of the manufacture is unacceptable. The poor reactivity and lack of reproducibility can lead to high release forces and other undesired film properties. In addition the lack of reproducibility can lead to an unpredictable bath-life for the emulsion. Without being bound to any theory one might assume that such differences are possibly due to the formation of droplets of the individual components having a different particle size, viscosity and miscibility, and as a consequence does not result in a uniform coating, leading to a decrease in reactivity and coating quality, such as rubb-off or smear.

So far there is no teaching in the prior art how to manufacture and process highly reactive emulsions of curable siloxanes in a coating process without the aforementioned disadvantages.

BRIEF SUMMARY OF THE INVENTION

The present inventors have surprisingly found that the above described problems can be overcome by a process which requires only one mixing step for the single water-free components of a reactive silicone-based composition and one emulsification step, wherein the reactive silicone-based compositions are first mixed, emulsified and then used in-line with the coating process. Surprisingly it was found that mixing the silicone composition and emulsification using simple in-line emulsification equipment, led to emulsions with sufficient bath-life for convenient use and nevertheless high reactivity. The manufacturer of the inventive 'One-Part'-emulsions can control now the period of time and conditions under which the reactive droplets have contact to the water phase. The resulting bath-life and coating reactivity were particularly advantageous using emulsifiers in particular based upon polyvinyl alcohol polymers. The coatings properties are of high quality.—This highly flexible process can thus be employed by the manufacturers of the coated substrate, avoiding any problems such as loss in reactivity or the need for shipping large amounts of water under frost-free conditions.

This result is particularly surprising to those knowledgeable in the field, because it was found that the bath-life of the inventive 'One-Part'-emulsions was sufficient for reasonable handling, for example in buffer tanks or during brief shutdowns for maintenance of the coating lines. Without being bound to any theory, it was generally believed by those knowledgeable in the field of such reactive emulsions, that the bath-life or low reactivity of the state-of-the-art two-part emulsion systems after mixing was a result of the catalyst and the hydrogen-siloxanes being contained in different emulsion particles. These particles were mixed, proximately to one another, but the contents of the oil phases of individual emulsion particles are known to not intimately mix under normal conditions. In the state-of-the-art two-part emulsions the silicone coating material was believed to intimately mix during application to the substrate under shear in the application nip, or upon breaking the emulsion during evaporation of the water during curing. In the inventive one-part emulsions all the coating components are contained within each emulsion particle. Again, without being bound by theory, it is believed that the presence of a polyvinyl alcohol surfactant enhances the stability of these emulsions toward the reaction of hydrogensiloxanes with water. The full reactivity is then recovered upon evaporation of the water during curing on the substrate.

DETAILED DESCRIPTION OF THE INVENTION

Accordingly the present invention provides a method of coating substrates with an aqueous emulsion of a reactive silicone-based composition, which comprises the steps of:
  i) mixing components to form the reactive silicone-based composition,
  ii) mixing said reactive silicone-based composition with water to form the aqueous emulsion of said reactive silicone-based composition,
  iii) coating the substrate with said aqueous emulsion of said reactive silicone-based composition, and
  iv) curing said reactive silicone-based composition on said substrate to form said silicon-coated substrate.

Figure 1:
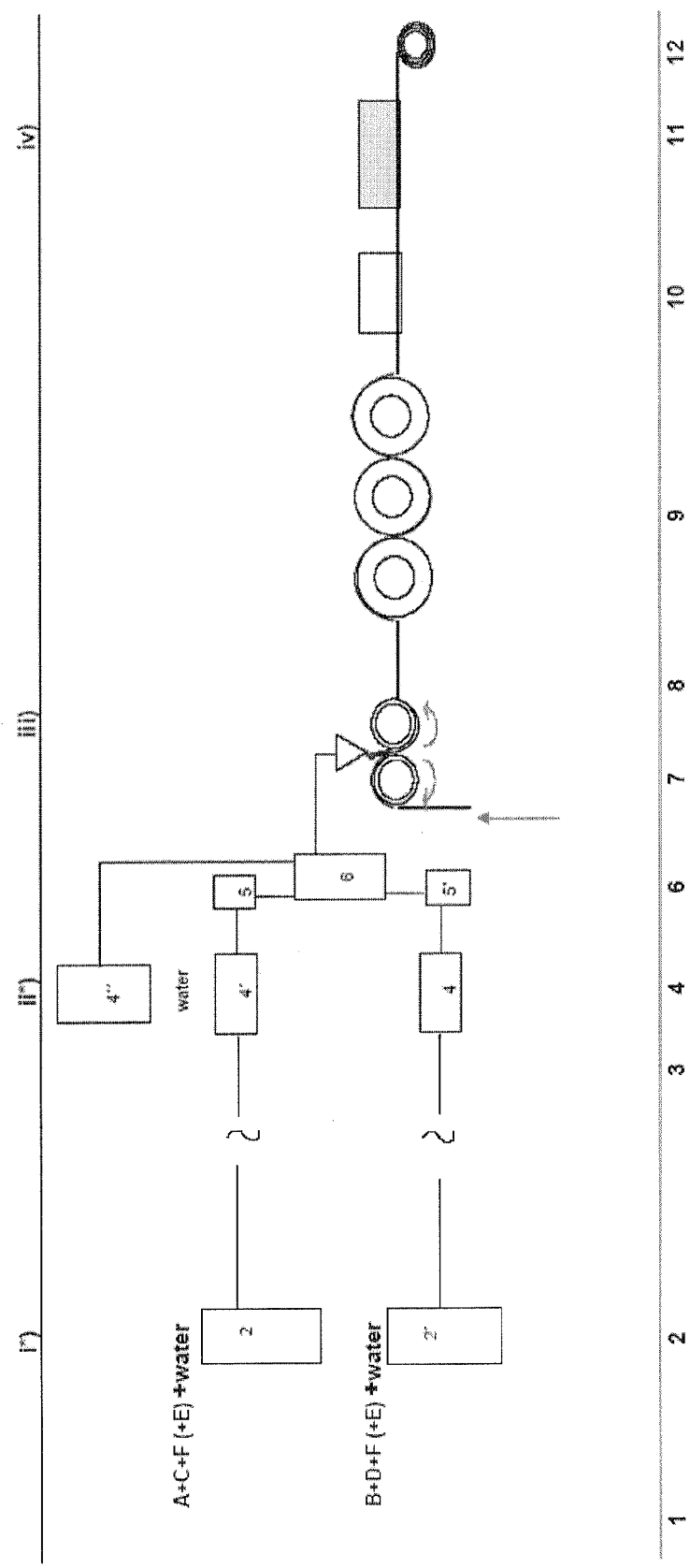
FIG. 1 is a schematic depiction of a state of the art process.
Figure 2:
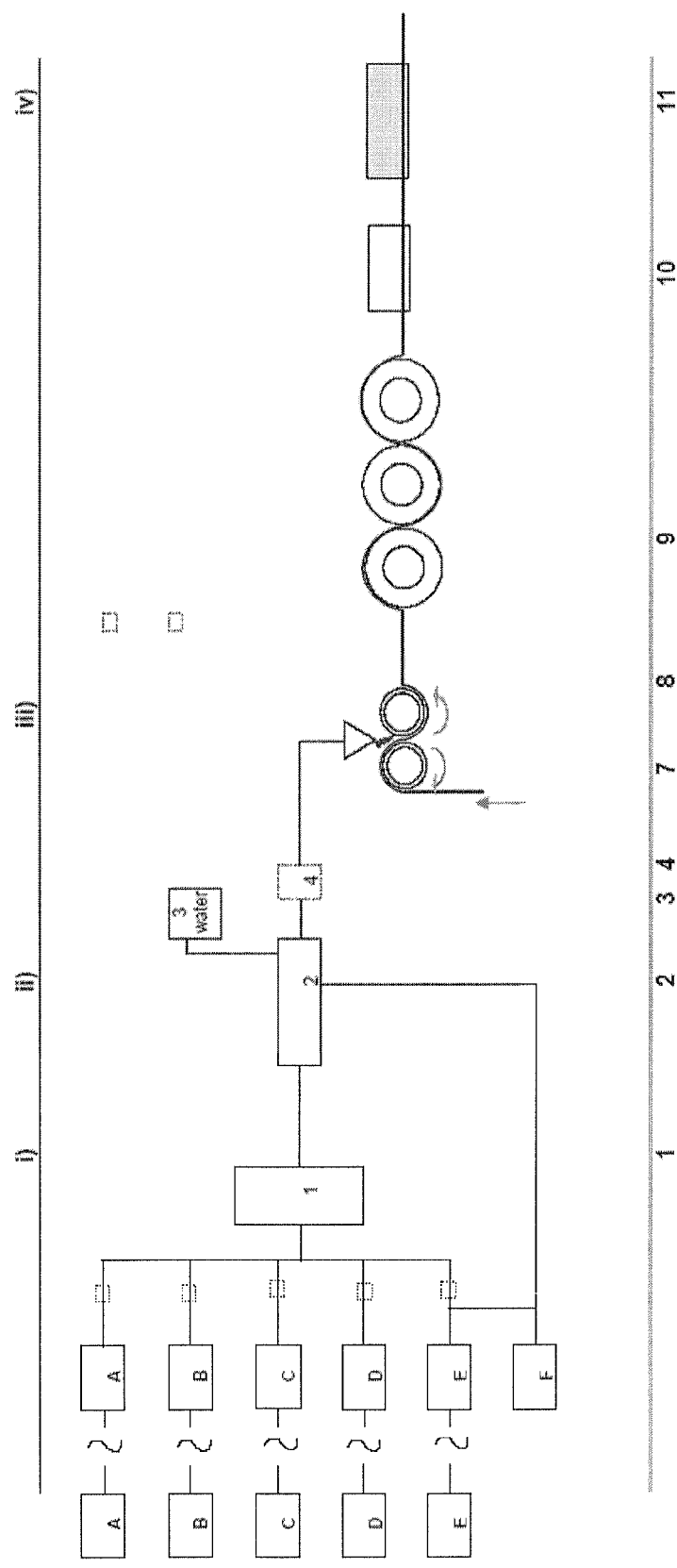
FIG. 2 is a schematic depiction of process steps of the inventive process.

FIG. 1 shows schematically the means of a process state of the art, whereas the FIG. 2 shows schematically the sequence of steps and means of the inventive process.

In FIG. 2 the tanks (A) to (F) and the metering systems provide the single components (A) to (F) for the mixing step i) are realized in the mixing unit (1) to give the reactive water-free composition comprising (A) to (E) and optionally (F). The water tank (3) provides the aqueous continuous phase for the emulsification unit (2) in step ii). The reactive composition is fed after step ii) into an optionally (small) buffer tank (4), which can store an amount of the reactive emulsified composition necessary for the coating process for a period of up to 10 h and which release the reactive component into the dispenser unit (7).

The units (7) and (8) represent the dispenser and coating unit, which are selected from the group of individual apparatuses as described below.

The coated substrate passes the transport rolls (9), which can serve in the same time as heated rolls for drying and curing. The unit (10) represents the optional drying unit, and symbol (11) represents the optionally used curing unit, if the cure could not already be completed in the unit (9).

The function of the unit (12) is to wind-up the coated substrate carrying the cured silicone layer by means of a winding roll.

The process of mixing the single components of the reactive silicone-based composition in the step i) comprises all methods of discontinuous and preferably continuous mixing methods, such as feeding into standard containers, vessels or reactors which are equipped with standard stirrers as well as static mixers, pumps or nozzles which are able to mix the liquid components without additional heat build-up. i.e. the mixing temperature should be controlled to be below 40° C. in order to prevent premature cure of the reactive components.

A reactive silicone-based composition is a composition that is curable, in particular upon heating and/or irradiation.

The time after the reactive silicone-based composition has been formed, that is, in case of the hydrosilylation curing system, the time after at least the components (A) to (C) have become part of the composition, until the time of doubling the viscosity of the reactive composition at 40° C. as defined or measured respectively below, is the bath-life time according to the invention.

The residence time in mixing step i) is suitable less than the bath-life time of the reactive silicone-based composition, i.e. preferably less than 36 h, more preferably, less than 10 h, still more preferably less than 1 h.

The method of the invention can be extended to several embodiments of the reactive siloxane systems suitable for making release coats onto substrates. Said reactive silicone-based compositions are suitably selected from the group of heat- and/or light curable siloxane compositions. The cure reactions comprise hydrosilylation, condensation or radical or cationic light induced crosslinking.

In step i) suitably the following components are mixed together:
  (A) one or more polyorganosiloxanes having in average at least two alkenyl groups,
  (B) one or more polyorganosiloxanes having in average at least two SiH groups,
  (C) one or more hydrosilylation catalyst,
  (D) optionally one or more inhibitors of the hydrosilylation reaction,
  (E) optionally one or more auxiliary agents,
  (F) optionally one or more emulsifiers.

The sequence of mixing components (A) to (F) in general requires to add an inhibitor (D) before the catalyst (C) is admixed, or the siloxane hydrides (B) have to be admixed as the last component. I.e. the preferred sequence of unification is mixing the components in a sequence (A), optionally (D) or (C), optionally (E), optionally (F) and finally (B), or in a sequence (A), (B), optionally (E), optionally (D), optionally (F) and finally (C).

In a preferred embodiment this process does not need the assistance of pumps or other complicated mixing units. For example one can obtain a mixture by discharging the components by gravitation over valves in a buffer tank measuring the volume or weight of the desired composition.

The process step of step ii) i.e. the method to mix the reactive silicone-based composition with water is carried out in an appropriate emulsification unit.

Step ii) requires that the reactive silicone-based composition obtained in step i) is fed into an emulsification unit for carrying out step ii) before the end of the bath-life time of the reactive silicone-based composition. More preferably the reactive silicone-based composition obtained in step i) is fed into the emulsification unit well before the end of the bath-life time, that is, preferably within less than 36, preferably less than 10 hours after the reactive composition comprising at least components (A) to (C) has been formed, in order to have sufficient time for the emulsification step ii). Suitably the residence time for both steps i) and ii) are well below the so-called the bath-life time, i.e. below 36 h, preferably less than 10 hours.

As mentioned above, the time after a reactive silicone-based composition is formed, until the time where the viscosity of the reactive composition has been doubled at 40° C. is called the bath-life time according to the invention. The increasing viscosity over the time is measured in a Hoeppler viscosimeter or a Brookfield viscosimeter (spindle LV 1-6 with 10 rpm) at 40° C. Typical bath-life times of the invention are in the range of 0.5 h to 36 h, preferably 3 h to 10 h in order to enable the process in a bigger technical scale having stand-still events and minimum buffer capacity on the other and sufficient cure rate. The bath-life time is measured only with reactive composition obtained in step i). Nevertheless such a bath-life time also determines the possible time for step i) and ii) until the aqueous emulsion is applied, because the bath-life time of the reactive composition in general determines the reactivity of the reactive coating compositions.

Suitable processing times from forming the reactive composition in step i) (i.e. characterized by the presence of at least components (A) to (C) as defined below) until step iii) (coating of the reactive emulsion) depend not only on the bath-life times of the reactive composition formed in step i) but also for example from the temperature in the emulsification step ii).

Usually it is sufficient in order not to run into process difficulties due to premature curing to limit the time from forming the reactive composition (presence of at least the components (A) to (C)) until the coating of the reactive emulsion onto the substrate to a time period less than the bath life time of the reactive composition formed in step i), if the temperature in the emulsification step ii) is set to less than 40° C.

The bath life time of the reactive composition is generally determined by the amount of inhibitor, the catalyst concentration, the concentration of the reactive groups and their position in the siloxanes molecules, and the temperature level applied.

The mixing step i) and the emulsification step ii) are carried out preferably at a temperature level below 40° C., preferably room temperature, i.e. at 25° C. to 35° C. in order to ensure the desired bath-life time.

The emulsification step ii) comprises the application of shear energy to the mixture by means of suitable mixing units. With the application of suitable mixing units a desired droplet size to form a stable emulsion is achieved and simultaneously the temperature in the emulsification unit is controlled in order not to shorten unduly the bath-life time. The heat formed upon shearing is optionally removed from the emulsification unit by appropriate cooling units or direct cooling with crushed ice. If the process temperature exceed by accident the preferred temperature range of more than 40° C. the possible processing time is shortened, which requires in general that the reactive emulsion must be used in a shorter time frame.

The temperatures in the steps i) and ii) should be therefore controlled in general not to exceed more than 40° C. in order to avoid premature curing of the reactive mixture and the aqueous emulsion thereof.

If premature curing of the aqueous emulsion occurs, that is, if the reactive silicone-based composition present in the oil droplets of the emulsion are cured before the coating is achieved a matt appearance of the silicone coating layer is observed, possibly due to the fact that the premature cured droplets cannot coalesce to a continuous film and cannot penetrate into the surface of the fibrous substrate.

If heat is applied to a substrate, which is coated with prematurely cured reactive emulsion incomplete curing and adhesion to the substrate is observed and smear and rubb-off of the silicone layer occurs.

The process of step (ii) is carried out preferably in an emulsification unit applying for example high shear homogenizers or emulsifiers selected from group of apparatus based on the principles of a rotor-stator, like Ultra-Turrax, dissolver disks, mixing nozzles, like Venturi nozzles, high pressure jets or homogenizers, other injectors, like Gaulin machines, colloid mills and other machine suitable for the manufacture of emulsions as described for example in WO 99/15263, DE 1519834, DE 4412261 A1, GB 2233572, EP-A-554719, EP-A-475284, and EP-A-101007.

Preferably to prepare the emulsions, use is made of a stator-rotor stirrer obtainable for example under the trade name "Ultra-Turrax" T50 from Janke & Kunkel, D-79219 Staufen, fitted with dispersing tool S50-G45M.

Suitable machines are those types which can achieve preferably an average droplet size of less than 20 μm, most preferably less than 10 μm, determined as average particle size $D_{50}$ (50% of the total volume) by the method of scattering of a laser light beam through the emulsion. The values means the volume distribution of the $D_{50}$ value, see below.

The present invention allows in general bigger droplet sizes than one must provide for emulsions intended for longer storage or shipping times as known in state of the art, because the reactive aqueous emulsions are usually used directly. This reduces in general the emulsification efforts and also the amount of emulsifier required, which might have a negative impact during coating. Thus droplet sizes characterized by a $D_{50}$ value of more than 1 μm or even more than 2 μm are possible.

The particle size is measured in the present invention in particular by using a Beckman Coulter Particle Sizer Model LS 13320 according to the Frauenhofer-Mie-Theory of light scattering applying the method ISO 13320-1 (1990): Particle size analysis—Laser diffraction methods. See also I. Zimmermann Ingenieur Technik 68 (1996) Nr. 4.

In particular, the use of emulsifiers in smaller concentrations avoids their negative impact on release forces.

In the present invention preferably one or more emulsifiers are used. The emulsifier can be added in step i) as a part of the reactive composition in order to simplify the formation of the reactive emulsion in step ii). It is also possible to add the emulsifier(s) in step ii) or to add the emulsifier(s) in both steps i) and ii). It is preferred according to the invention to use an emulsifier, preferably to use the emulsifier only in step ii).

Emulsifiers useable as an optional component (F) (in step i) or ii)) are preferably selected from the group consisting of non-ionic emulsifiers or non-ionic emulsifiers with smaller amounts of ionic emulsifiers, having a viscosity of 5-100 mPa·s at 25° C. preferably 10-70 mPa·s, such as polyethers of ethylene and propyleneoxides bearing OH groups, having ether, esters or amides endgroups, or polyvinylalcohols. The preferred emulsifiers are polyvinylalcohols having a degree of hydrolysis of 50 to 100 mol. %, preferably 70 to 95 mol. %, most preferably 85 to 90 mol. %. More details are described under component (F) below.

In general smaller particles and smaller distribution width is preferred, because the ability to build a continues film is facilitated.

The average particle diameter $D_{50}$ should be understood to refer to the mean volume, i.e. the calculated diameter of a particle resulting from the total volume of all particles sizes in the emulsion divided by the number of particles.

The values means the volume distribution of the $D_{50}$ value.

The method of making the reactive emulsion in step ii) comprises a sequence whereby in step ii) water or part of the water preferably including the surface active emulsifier (F) is fed into the emulsification unit before, simultaneously and/or after feeding the reactive silicone-based composition comprising components (A) to (E) into the emulsification unit.

A preferred method of making the reactive emulsion comprises dispersing the reactive composition obtained in step i) comprising components (A) to (C) and optionally (D) and (E) in a water phase, which contains already the component (F) i.e. the surface active emulsifier, which has been premixed in the water phase by a simple stirrer or static mixer before the components (A) to (E) are emulsified into the water phase.

In the method according to invention the weight of the water fed in step ii) is preferably greater than the weight of the reactive silicone-based composition fed in step ii). I.e. the percent ratio by weight of water to the total weight of the components (A) to (F) after step ii) is at least 30%, preferably between 50 and 95%, whereby in all cases water is the continuous phase of the emulsion.

The emulsification step ii) can be carried out in two—or more step manner, in that the emulsification is carried out first with only a part of the total amount of the water to form a concentrated emulsion, which is diluted by the addition of water to the application concentration in step iii).

The according to the invention comprises preferably a step, wherein the aqueous emulsion of said reactive silicone-based composition obtained in step ii) is fed into a dispenser unit before coating the substrate in step iii).

In order to enable a thin and uniform layer of the non-cured emulsion onto the substrate it is preferred to apply any kind of a dispensing unit or tool which can distribute the liquid silicone composition on transfer roll. This tool can be a dispenser or bath, which is in close contact to a transfer roll. The dispensers are selected from the group which consists of slit nozzles, needle nozzles, valves, spray nozzles, pouring nozzles, air brushes, trough or bathes close to rolls such as a Foulard process, knifes, bars (Bar Coater), blades, Doctor Blades, Doctor Blade Chambers (15) metering pumps, cartridges or powered syringes, size presses, film presses or other tools by dipping, brushing, flow coating, trailing blade, inverted blade, SDTA (Short Dwell Time Applicator), roller blade, reverse roll coating, Kiss Coating, spraying, rolling or printing, by means of an Offset Gravure-coating apparatus, by (air)-knife or Doctor-blade coating or using an airbrush.

Suitable dispenser are described e.g. in Ullmann's Encyclopedia of Industrial Chemistry Release 2007 $7^{th}$ Edition Coating Chap. 8.3. FIGS. 23 to 25 or Paper & Pulp (2005) Tab. 23 p. 116 and incorporated by reference the technical brochure -04/e/05.99/111-, e.g. Examples of Coating Methods in Polytpye 'The science of perfect finishing: Coating Heads Polytype', CH 1701 Fribourg Switzerland, 26 Route de la Glane.

Figure 5:
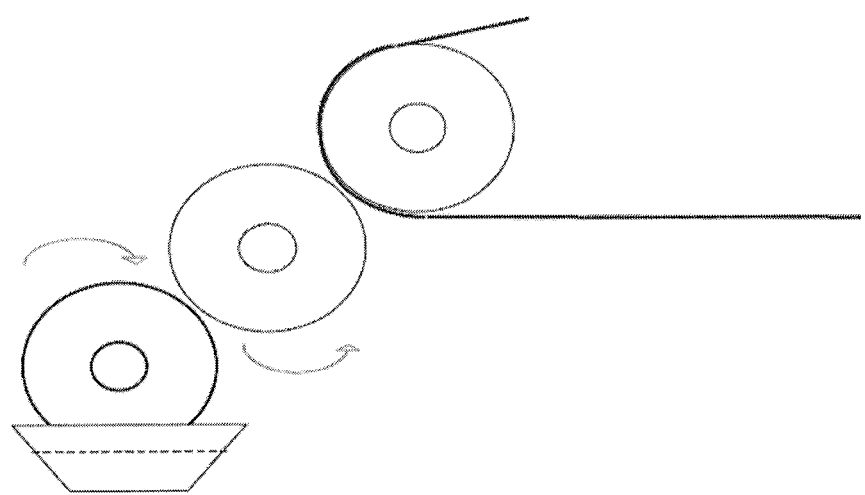
FIG. 5 is a schematic depiction of a Foulard trough (reverse Gravure roll) of the invention.

Preferred dispensers are size presses, troughs such as in a Foulard process, and troughs onside the applicator roll having feed tank such as a Doctor Blade Chamber (15) with circulation pump (14) and a buffer tank (13) as shown in FIG. 5.

In the method according to the invention step iii) is carried out preferably with at least one transfer unit in order to apply the aqueous emulsion of said reactive silicone-based composition onto said substrate.

The aforementioned dispensers can already be an integrated part of the transfer unit or coating facility. Therefore the transfer units, which are suitable for this coating process are selected from group of the afore mentioned dispenser units and transfer units based on multi roller systems, wherein said transfer units are selected from the group consisting of multi-roll systems, Doctor blades, Mayer bars, gravure roller systems or rollers of size press or gate roll types.

Preferred dispensers are coating heads like all kinds of doctor blade chambers (15) at different positions close to the rolls, multi roll coaters, gravure coaters, size presses, Mayer bar coaters, or Foulard troughs.

Figure 3:
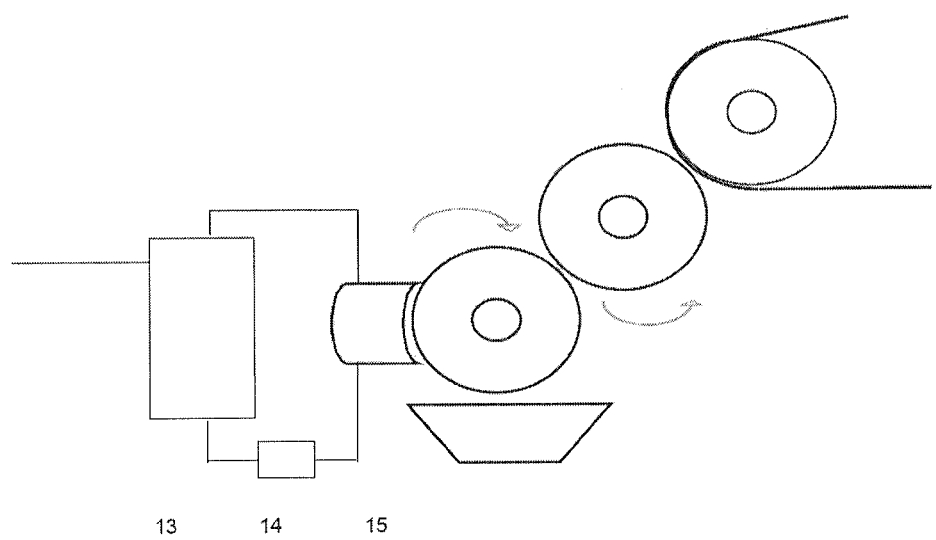
FIG. 3 is a schematic depiction of a doctor blade chamber of the invention.
Figure 4:
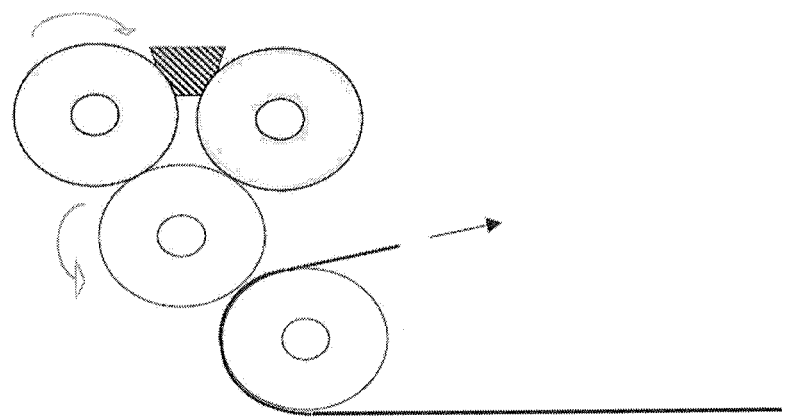
FIG. 4 is a schematic depiction of a roll coater and nip feeder of the invention.

The FIGS. 3 to 5 show the preferred embodiments of the combined dispenser and coating units.

In a preferred embodiment (alpha) of the inventive process acc. to FIG. 2 the process therefore comprises the steps i) to iv), whereby the step
  i) is realized by a static mixer,
  ii) is realized by a pressurized nozzle used as emulsification unit,
  iii) is realized by size press rolls which are fed by a buffer tank and optional a circulating pump,
  iv) is realized by more than one steam heated rolls and optional a hot air tunnel.

The size presses which are fed by a buffer tank and a circulating pump are such as shown in FIG. 2 unit (7).

In an other preferred embodiment (beta) of the inventive process acc. to FIG. 2 the process therefore comprises the steps i) to iv), whereby the step
  i) is realized by a static mixer,
  ii) is realized by a pressurized nozzle used as emulsification unit,
  iii) is realized by a doctor blade chamber which is fed by a buffer tank and a circulating pump,
  iv) is realized by more than one steam heated rolls and optional a hot air tunnel.

The doctor blade chamber, which is fed by a buffer tank and a circulating pump is shown in FIG. 3.

In an other preferred embodiment (gamma) of the inventive process acc. to FIG. 2 the process therefore comprises the steps i) to iv), whereby the step
  i) is realized by a static mixer,
  ii) is realized by a pressurized nozzle used as emulsification unit,
  iii) is realized by a Foulard trough, iv) is realized by more than one steam heated rolls and/or a hot air tunnel.

The Foulard trough or the Reverse Gravure Roll is shown in FIG. 5.

The multi roller systems can comprise one or more metering rolls, a smoothing roll, an applicator roll and at least one backing roll. A typical system consists of 5 rolls or more. This surface can be made of steel, chromium or non-swelling elastomers or resins, such as polyurethane, nitrile or fluoro rubbers or resins.

The coating step iii) is carried out preferably by a method wherein said aqueous emulsion is applied onto said substrate in an amount of 0.25 to 200 g/m$^2$ of the aqueous emulsion on said substrate, preferably 0.25 to 100 g/m$^2$.

The aforementioned amount of the aqueous emulsion is usually applied in an amount to obtain a dry coating weight of the cured siloxane layer on the substrate in an amount of 0.1 to 10 g siloxane per m$^2$ of said substrate.

A preferred coating weight of dried siloxanes is 0.2 to 5 g/m$^2$, more preferred 0.3 to 3 g/m$^2$ siloxanes determined by FINAT (Test method number 7: Energy-Dispersive X-Ray Fluorescence Spectroscopy, described in FINAT Technical Handbook of Test Methods).

The inventive process comprises also a method according to which after step iii) and before step iv) water is separated from said substrate coated with said aqueous emulsion in a water separation step.

When the emulsified droplets wet and spread over the surface of the substrates the droplets are growing to bigger droplets under the effect of coalescence. The water phase appears on the siloxanes layer as separated droplets or becomes partly absorbed by the fibrous substrate.

The methods for the separation of water from fibrous layers are selected from group of drying processes, like centrifugation, wiping, evaporation assisted by additional air streams including heated air, heated inert gas like nitrogen or steam heated rolls to better control the temperature of the carrier layer.

The manufacturers of apparatus covering this unit operations provide multiple systems selected from the group of jet dryers, hot air gas or infrared tunnels, felt dryers, steam heated cylinders, blow boxes, blow pipes and the like see Ullmann's Encyclopedia of Industrial Chemistry Release 2007, 7$^{th}$ Edition Paper & Pulp (2005) Tab. 23 p. 116.

In a preferred embodiment the curing step iv) is carried out by passing the coated substrate, optionally after a water separation step, through at least one curing unit. Such curing step is preferably carried out continuously, for example by passing the substrates to be coated continuously through a curing unit.

The curing units applied in this process comprise all types of means, which can heat up the coated substrate to a temperature level sufficient to cure the siloxanes layer in the shortest time possible under the constraint that the substrate is not destroyed. Suitably curing units, wherein an optimal temperature control can be achieved include for example steam heated cylinders or rolls.

The temperature on the substrate at curing is usually in the range of 40 to 230° C., preferably 80 to 190° C.

The curing step is suitably carried out by passing the substrate continuously through a heating unit, in particular, by heating e.g. in an heating tunnel having an air temperature in the range of 80 to 300° C., preferably at 80 to 250° C., more preferably at 90-200° C. The temperature on the substrate surface may differ to this temperature, and is usually somewhat lower than the air temperature.

The practical cure temperature depends on the material used as substrate and on the reactivity of the coating composition. Substrate temperatures therefore can be between 40-230° C., preferably for heat curable systems from 110-190° C., more preferably from 110-170° C. and preferably for light activated systems 40-110° C.

The curing unit in step iv) can further include a method, wherein said curing in said curing step iv) is carried out by irradiating the uncured silicone film on the substrate with light of a wave length in the range of 190 to 500 nm, optionally at an elevated temperature. The sources for the irradiation or photo-activation are selected from the group of UV-beamers, such as Xenon lamps, which can be used as flashlight lamps, un-doted lamps or mercury lamps doted with iron or gallium, 'Blacklight'- or eximer lamps. The irradiation energy (radiation dosexirradiation time per volume element) will be selected with respect to the type of the process, the chosen silicone composition and the temperature of the coating mass or layer in order to ensure a sufficient cure rate.

The band speed during coating process is adjusted by transport and winding rolls, wherein the coated substrate after passing the curing step in step iv) is collected by winding it on that winding roll. The band speed is mainly controlled by the speed of the winding roll, wherein the winding roll is operated preferably with band speed of 50 to 1000 m/minute. A more preferred speed is 50 to 500 m/minute, still more preferred 70 to 300 m/minute.

The substrates to be coated are preferably fibrous or porous material, which preferably have a sheet-like form. These sheet-like substrates are for example selected from the group of woven or non-woven fabrics, papers or plastic films, wherein a preferred substrate to be coated is selected from the group consisting of fiber-like substrates and plastic films.

Suitable substrates for the production of release, backing and interleaving papers are nearly all kinds of papers, preferably parchment, glassine and Kraft papers. In addition the substrates are selected from the group of interleaving papers, cast films or decorative films, foams, including those of polyurethane, interleaving cards, films and cloths, reverse faces of self-adhesive tapes, self-adhesive films, text-bearing faces of self-adhesive labels, packaging material, cardboard boxes, metal foils, drums, cardboards, plastic films such as glassine paper, Kraft paper, chemical papers, calendered or glazed papers, parchmentized papers or precoated papers, woven and non-woven fabrics.

The preferred fiber-like substrates are selected from the group of papers such as glassine paper, Kraft paper, chemical papers, calendared or glazed papers, glassine papers, parchmentized papers or precoated papers.

The coated substrates having the release layer of this invention can be used for the storage and/or transportation of tacky goods, such as adhesives, sticky food-stuffs, for example cakes, honey, candies and meat, bitumen, asphalt, greased materials and crude rubber, vegetable parchment, polyethylene- or carboxymethyl cellulose-coated papers, cellulose sheets.

The substrates may consist of more than one layers, which may include a carrier layer.

The plastic films are selected from the group of thermoplastics, such as polyethylene, low and high density, polypropylene already axial orientated or not, polyesters, polyterephthalate-copolymers, and polyamides. The achieved coatings are mechanical hard enough to get winded on a roll, while remaining sufficiently flexible/supple, which greatly facilitates automatic machine punching of flexible adhesive-coated composites, especially papers.

The novel process applying directly 'In-line'-mixed cross-linkable emulsions can be applied nearly to all such surfaces, which are to be rendered repellent to tacky substances.

The addition-cross-linkable emulsions in this 'In-line'-process are suitable for the production of the self-adhesive layers or sheets connected to the release paper, either applied by the off-line method or by the in-line method. The aqueous emulsion compositions according to the invention may be applied to any supple materials or substrates, which will subsequently come into contact, The process for mixing, emulsifying, coating and curing of a release coating onto a sheet-like substrate carrier comprises the use of a composition of siloxanes having reactive groups which are curable under the interaction of radiation or heat within a short time frame.

Suitable reactive silicone-based composition, which are mixed in step I) of the process of the invention, comprise
  (A) one or more polyorganosiloxanes having in average at least two alkenyl groups,
  (B) one or more polyorganosiloxanes having in average at least two SiH groups,
  (C) one or more hydrosilylation catalyst,
  (D) optionally one or more inhibitors of the hydrosilylation reaction,
  (E) optionally one or more auxiliary agents,
  (F) optionally one or more emulsifiers.

A suitable mixing range of the components (A) to (F) includes:
  100 wt.pt of one or more alkenyl-containing siloxanes (A),
  0.2 to 100 wt.pt. of one or more SiH group containing siloxanes (B) in order to provide a molar SiH:Si alkenyl ratio between 10:1 to 0.7:1,
  0.1 to 5 wt.pt. of one or more hydrosilylation catalysts (C) which usually corresponds to 1-500 ppm Pt related to metal,
  0-2 wt.pt. of an inhibitor (D) controlling the cure rate
  0-20 wt.pt of auxiliary agents (E)
  0-20 wt.pt of emulsifiers (F).

Components (A) to (F)

The component (A) is preferably a linear or branched polyorganosiloxane or a mixture of more than one thereof having in average 2 or more alkenyl groups per molecule and has preferably a viscosity of 40 to 400,000 mPa·s at 25° C. and preferably a concentration of the alkenyl groups of 0.15 to 3.9 mol.-%.

The mol-percentages of the alkenyl groups in the present invention relates to the number of alkenyl groups to the number of Si-atoms.

In a preferred embodiment of the invention at least one of the components (A) and (B) should have a functionality of more than two, in order to achieve cross-linking upon curing. In particular, if the component(s) (A) have about 2 alkenyl groups in average, then at least more than 30 mol % of the component (B) should have a SiH functionality more than 3, in order to provide sufficient cross-linking, resulting in improved toughness and hardness respectively of the cured coating.

In particular, components (A) can have the formula (I):

   (I)

wherein
m=1-2000
a=1-40
b=0-2000
c=0-50
d=0 or 1,
and M, D, T and Q are as defined below and wherein the siloxy units M, D, T and Q can be distributed blockwise or randomly in the polymer chain, with $M=R_3SiO_{1/2}$,
$D=R_2SiO_{2/2}$,
$T=RSiO_{3/2}$, and
$Q=SiO_{4/2}$, wherein R is an organic group, with the proviso that the siloxanes in average comprise at least two alkenyl groups per molecule.

Preferred alkenyl-containing polyorganosiloxanes (A) are vinyl terminated polyorganosiloxanes or mixtures thereof as disclosed e.g. in U.S. Pat. No. 6,3875,487 following the general formula (I) or (II) as defined below, composed out of siloxane units selected from $M=R_3SiO_{1/2}$, $D=R_2SiO_{2/2}$, $T=RSiO_{3/2}$, $Q=SiO_{4/2}$ Additionally divalent $R^2$-groups may be present, that connect M, D, T or Q.

R is selected in particular from n-, iso-, tertiary- or $C_1$-$C_{30}$-alkyl, $C_2$-$C_{12}$-alkenyl, $C_1$-$C_{12}$-alkoxy($C_1$-$C_{12}$)alkyl, $C_5$-$C_{30}$-cyclic alkyl, $C_5$-$C_{30}$-cyclic alkenyl or, $C_6$-$C_{30}$-aryl, $C_7$-$C_{30}$-alkylaryl, which can contain one or more O-, N-, S- and/or F-atoms, resulting for example in ethers groups, including poly($C_2$-$C_4$-alkylene)ethers with up to 1000 alkyleneoxy units.

Suitable examples include alkyl radicals, preferably $CH_3$—, $CH_3CH_2$—, $(CH_3)_2CH$—, $C_8H_{17}$— and $C_{10}H_{21}$—, cycloaliphatic radicals, such as cyclohexylethyl, limonenyl, aryl radicals, such as phenyl, tolyl, xylyl, aralkyl radicals, such as benzyl and 2-phenylethyl, fluoroalkyl groups, such as $C_nF_{2n+1}CH_2CH_2$— wherein n has a value of from 1 to 10, such as, for example, $CF_3CH_2CH_2$—, $C_4F_9CH_2CH_2$— and $C_6F_{13}CH_2CH_2$—. Particularly preferred groups for R are methyl, phenyl, 3,3,3-trifluoropropyl.

The polysiloxanes (A) comprise for R in average at least two alkenyl groups $R^1$.

Suitable groups $R^1$ include for example n-, iso-, tertiary- or cyclic-$C_2$-$C_{30}$-alkenyl, vinyl, $C_6$-$C_{30}$-cycloalkenyl, cycloalkenylalkyl, norbornenyl-ethyl, limonenyl, $C_8$-$C_{30}$-alkenylaryl, optionally containing one or more O- or F-atoms.

Preferred examples for $R^1$ include vinyl, allyl, methallyl, 3-butenyl, 5-hexenyl, 7-octenyl, cyclohexenylethyl, limonenyl, norbornenylethyl, ethyliden-norbornyl, styryl and vinylphenylethyl. The alkenyl radicals are preferable attached to terminal silicon atoms, and the olefin function is preferably at the end of the alkenyl group of the higher alkenyl radicals, because of the more ready availability of the alpha, omega-dienes used to prepare the alkenylsiloxanes by hydrosilylation.

Particularly preferred groups for $R^1$ are vinyl and 5-hexenyl.

Bridging groups $R^2$ include divalent aliphatic or aromatic n-, iso-, tertiary- or cyclo-$C_1$-$C_{14}$-alkylen, arylen or alkylenaryl groups which bridges additionally siloxy units and preferably does not exceed 30 mol. % of all siloxy units.

Examples of suitable divalent hydrocarbon groups of $R^2$ include any alkylene residue, preferably such as —$CH_2$—, —$CH_2CH_2$—, $CH_2(CH_3)CH$—, —$(CH_2)_4$—, —$CH_2CH(CH_3)CH_2$—, —$(CH_2)_6$—, —$(CH_2)_8$— and —$(CH_2)_{18}$—; cycloalkylene radical, such as cyclohexylene; arylene radical, such as phenylene, xylene and combinations of hydrocarbon radicals, such as benzylene, i.e. —$CH_2CH_2$—$C_6H_4$—$CH_2CH_2$— and —$C_6H_4CH_2$—. Preferred groups are α,ω-ethylene, α,ω-hexylene or α,ω-phenylene, or $CH_2CH_2OCH_2CH_2CH_2$— and —$C_6H_4$—O—$C_6H_4$—. Examples of suitable divalent halohydrocarbon radicals $R^2$ include any divalent hydrocarbon group, wherein one or more hydrogen atoms have been replaced by halogen, such as fluorine or chlorine. Preferable divalent halohydrocarbon residues have the formula —$CH_2CH_2C_nF_{2n}CH_2CH_2$— wherein n has a value of from 1 to 10 such as, for example, —$CH_2CH_2CF_2CF_2CH_2CH_2$—.

Component (A) thus includes linear siloxanes (A1), comprising essentially no T- and/or Q-groups and branched siloxanes (A2) comprising mandatorily Q- or T-units.

One preferred embodiment of component (A1) includes linear polyorgano-siloxanes having alkenyl endgroups according to formula (Ia).

$$R^1R_2SiO(R_2SiO)_{b1}SiR_2R^1 \quad (Ia)$$

with b1=40-2000, wherein R and $R^1$ are as defined below.

In a preferred embodiment the linear polymers (A1) have the formula:

$$M^{Alkenyl}{}_2 D_{40\text{-}2000},$$

wherein $M^{Alkenyl}{}_2$ and D is as defined below.

The linear polymers (A1) preferably have an alkenyl concentration in the range of 0.15 to 3.9 mol.-% with a viscosity in the range of 50-200,000 mPa·s, more preferably 0.36 to 1.96 mol. % with a viscosity in the range of 100-10,000 mPa·s, and most preferred 0.55 to 1.96 mol. % with a viscosity range in the range of 100-5,000 mPa·s each at 25° C. and at a shear rate of $D=1$ $s^{-1}$.

The other preferred embodiment of component (A) comprises branched, liquid polysiloxanes (A2)

$$[M_{a1}D_{b1}T_{c1}Q_{d1}]_{m1} \quad (Ib)$$

wherein M, D, T and Q, and a, b, c, d and m is as defined below, preferably $$T_{2\text{-}40}\text{-}D_{50\text{-}2000}\text{-}M_{0\text{-}40}M^{alkenyl}{}_{3\text{-}40} \quad (Ic)$$

wherein T, D, M and $M^{alkenyl}$ are as defined below, having preferably an alkenyl concentration of preferably 0.5 to 3 mol. % and a preferred ratio of D/T of 10-50.

If the component (A) consists of 2 or more single alkenyl polymers, the above mentioned viscosities or alkenyl preferably vinyl concentrations may exceed the aforementioned range as long as the mixture of component (A) lies in the defined range.

The average chain length of polymers in the component (A), having the aforementioned viscosities, is in general in the range of 40 to 2000 SiO-units determined by GPC with polystyrene as standard.

The average chain length defined by the average $P_n$ (average degree of polymerisation) is determined by the equation $P_n=(M_n/\text{molecular weight of the repeating siloxy unit})$. The $M_n$ value is the number average molecular mass wherein the rest of low molecular weight polyorganosiloxanes up to 10 siloxy units are not counted. These low molecular weight polyorganosiloxanes are mainly comprised of cyclic polyorganosiloxanes.

A further preferred embodiment of the component (A2) comprises the vinyl rich polyorganosiloxanes having alkenyl groups according to formula:

$$T_{2\text{-}10}\text{-}D_{50\text{-}500}\text{-}M_{0\text{-}10}M^{alkenyl}{}_{3\text{-}10} \quad (Id)$$

wherein the siloxy units M, D, T and Q can be distributed blockwise or randomly in the polymer chain.

In the vinyl rich polysiloxanes (A2) of a preferred embodiment the content of T- and Q-units do not exceed 10 mol. % of all siloxy units. In this case polysiloxanes (A2) are referred to as components (A2-1).

However, there is another embodiment of branched polysiloxanes (A2), called component (A2-2), which have a high degree of branching i.e. more than 10 mol. %, preferably more than 20 mol. % of all siloxy units. Those components (A2-2) provide in particular the effect of controlling, in particular, increasing the release forces of the coated substrates from other substrates attached thereto, in that they lead to an increase in stickiness of the coating layer.

Linear polysiloxanes (A1) and vinyl rich polysiloxanes (A2-1) (low branching density) and branched polysiloxanes (A2-2) (high branching density) can be combined in any possible combination in order to modify the release forces of the coated substrate. In preferred embodiments there are used:

Linear polysiloxanes (A1) alone,

Vinyl rich, branched polysiloxanes (A2) alone, preferably polysiloxanes (A2-1) (low branching density) alone, optionally in combination with branched polysiloxanes (A2-2) (high branching density), Combination of linear polysiloxanes (A1) and branched polysiloxanes (A2), including polysiloxanes (A2-1) (low branching density) alone, optionally in combination with branched polysiloxanes (A2-2) (high branching density).

The polysiloxane (A-1) is in general a flowable fluid with a Newton like viscosity but not solid at 25° C.

The component (A) may optionally contain 0-40 wt. % of (A2-2) serving as Controlled Release Additives (CRA), which are in general resin-like polymers liquid or solid at 25° C. Preferably they have the formula $[M_aD_bT_cQ_d]_m$, wherein b is below 10 and the index a is <4 while c+d=1, and m=1 to 1000. Preferably they include solid resins $[M_{0.6\text{-}4}Q]_{1\text{-}1000}$ and they are either solved or at least dispersed in the main polymer component of (A). Such resinous molecules can contain significant concentrations of SiOH and/or $(C_1\text{-}C_6)$-alkoxy-Si groups up to 10 mol. % related to the silicon atoms. They can be admixed as solution in polymers or solvents. As mentioned above the purpose of these polymers is to increase the release force of the silicone release layer, i.e. making the release layer more tacky for example in the contact to any label stock.

Other types of CRA-compounds can be used as component (A) including molecules comprising structural elements of $[M_aD_bT_cQ_d]_m\text{-}D_x$ having block-like $D_x$-structures, preferably for example $[M_{0.6\text{-}4}Q]_{1\text{-}1000}\text{-}D_{100\text{-}2000}$. Those compounds are also used as Pressure Sensitive Adhesives (PSA). In anticipation of further possible CRA compounds it is mentioned already that similar compounds without alkenyl groups may be used as additives in the reactive silicone-based composition.

In accordance with the invention it is possible to use a mixture of different polyorganosiloxanes (A) having different alkenyl contents, preferably higher vinyl contents in order to improve the mechanical properties, such as tensile strength, tear propagation resistance or stiffness or crosslinking density of the silicone layer.

The increase of the vinyl concentration can be achieved either by short siloxane chainlength whereby the ratio of $M^{alkenyl}$: D increases, or which can be realized in structures like $[M_aD_bT_cQ_d]_m$ of a polymer (A2), wherein the index 'a' is >2, or by additional alkenyl side groups such R(alkenyl) SiO ($=D^{alkenyl}$) or alkenyl-$SiO_{3/2}(=T^{alkenyl})$, i.e. (alkenyl) $R_2SiO_{1/2}$: D, where the concentration of endgroups M remain constant.

If in accordance with the present invention for example a mixture of a alkenyl-poor polyorganosiloxane (A), e.g. $M^{alkenyl}$: D=2, and a alkenyl-rich polyorganosiloxane (A) is preferred. In such a case it is preferred to select a weight ratio of (A-alkenyl-poor):(A-alkenyl-rich) between 100:0.5 to 50:50, preferably between 98-60:2-40, most preferably between 90-70:10-30 in order to suitably adjust satisfactory mechanical properties, like hardness or tension/modulus of the cured siloxanes layer.

Preferably the branched polymer (A2) has more than 3 alkenyl groups, because otherwise the reactivity and crosslink density of the polyorganosiloxane is not sufficient with respect to smear and rubb-off of the release layer.

The alkenyl content is determined here by way of $^1$H NMR—see A. L. Smith (ed.): The Analytical Chemistry of Silicones, J. Wiley & Sons 1991 Vol. 112 pp. 356 et seq. in Chemical Analysis ed. by J. D. Winefordner.

The component (B) is preferably selected from linear, cyclic or branched SiH-containing polyorganosiloxanes of the general formula (II):

$$[M_{a2}D_{b2}T_{c2}Q_{d2}]_{m2} \tag{II}$$

in which
M=$R^4_3SiO_{1/2}$,
D=$R^4_2SiO_{2/2}$,
T=$R^4SiO_{3/2}$,
Q=$SiO_{4/2}$, in which
m2=from 1 to 1000
a2=from 1 to 10
b2=from 0 to 1000
c2=from 0 to 50
d2=from 0 to 1, and
$R^4$,R, $R^1$ or hydrogen, with the proviso that in average at least two radicals $R^4$ per molecule are hydrogen. The hydrogen atoms can occur simultaneously bind to one silicon atom preferably they bind two different silicon atoms. R being defined as above, R=methyl, phenyl, 3,3,3-trifluorpropyl, and $R^1$=vinyl, if present, being preferred.

Incidentally the polysiloxanes (A) and (B) used in the present invention may contain to a certain extent residues $R^3R^5O_{1/2}$, wherein $R^5O_{1/2}$ is an alkoxy or hydroxy residue at the silicon, preferably hydroxy, methoxy or ethoxy and can have concentrations up to 10 mol. %.

The polyhydrogensiloxanes (B) are preferably linear, cyclic, or branched polyorganosiloxanes whose siloxy units are advantageously selected from M=$R_3SiO_{1/2}$, $M^H$=$R_2HSiO_{1/2}$, D=$R_2SiO_{2/2}$, $D^H$=$RHSiO_{2/2}$, T=$RSiO_{3/2}$, $T^H$=$HSiO_{3/2}$, Q=$SiO_{4/2}$ in which these units are preferably selected from MeHSiO units and $Me_2HSiO_{0.5}$ units alongside, if appropriate, other organosiloxy units, preferably dimethylsiloxy units.

The siloxy units present in the component (B) can be linked to one another in the polymer chain, blockwise or randomly. Each siloxane unit of the polysiloxane chain can bear identical or different radicals of the group R.

The indices of the formula (II) describe the average degree of polymerization $P_n$, measured as number average $M_n$, determined by GPC (polystyrene as standard). The polyhydrogensiloxane (B) in particular encompasses all of the liquid, flowable, and solid polymer structures of the formula (II) with the degrees of polymerization resulting from the indices stated above. Preference is given to the polyhydrogensiloxanes (B) whose molar mass is smaller than about 60,000 g/mol, preferably smaller than 20,000 g/mol.

The preferred polyhydrogensiloxanes (B) have structures are selected from the group which can be described via the formula (IIa-IIf)

$$HR_2SiO(R_2SiO)_z(RHSiO)_pSiR_2H \tag{IIa}$$

$$HMe_2SiO(Me_2SiO)_z(MeHSiO)_pSiMe_2H \tag{IIb}$$

$$Me_3SiO(Me_2SiO)_z(MeHSiO)_pSiMe_3 \tag{IIc}$$

$$Me_3SiO(MeHSiO)_pSiMe_3 \tag{IId}$$

$$\{[R_2R^1SiO_{1/2}]_{0-3}[R^1SiO_{3/2}]\}_{m2} \tag{IIe}$$

$$\{[SiO_{4/2}][R_2R^1SiO_{1/2}]_{0.01-10}[R^1SiO_{3/2}]_{0-50}[RR^1SiO_{2/2}]_{0-1000}\}_{m2} \tag{IIf}$$

where
z=from 0 to 1000
p=from 0 to 100
z+p=b4=from 1 to 1000
m2=from 1 to 1000.

One preferred embodiment of the class (IIe) and (IIf) compound is provided by way of example by monomeric to polymeric compounds which can be described via the formula $[(Me_2HSiO_{0.5})_kSiO_{4/2}]_{m2}$ wherein index k can have integer or decimal values from 0.01 to (2*$m_2$+2). Such resinous molecules can contain significant concentrations of SiOH and/or ($C_1$-$C_6$)-alkoxy-Si groups up to 10 mol. % related to the silicon atoms.

The concentration of Si—H groups is preferably in the range from 0.5 to 100 mol. % preferably 1 to 88 mol. % related to total number of silicon atoms.

In case of polyhydrogen-methyl-siloxanes this range corresponds essentially to, or 0.1 to 17 mmol/g.

In a preferred embodiment mixtures of different Si—H components (B) can be used, in particular, mixtures of compounds of the formula (IId) and (IIa) and/or (IIc).

Mixtures composed of difunctional compounds (II) known as chain extenders (B1) and multi-functional compounds (II) known as crosslinking agents (B2) can be used by way of example as described in U.S. Pat. No. 3,697,473.

If it is necessary to still further increase the cure rate, this can by way of example be achieved via an increase of the ratio of SiH to alkenyl, or an increased amount of catalyst (C), or an increase in the proportion of polyorganosiloxanes (B) which contain $HMe_2SiO_{0.5}$ units. Thus preferred components (B) include $HMe_2SiO_{0.5}$ (MH groups), in order to provide faster curing rates.

In a further preferred embodiment, the amount of components (B1) and (B2) is
from 0 to 70 mol-% of (B1), and
from 30 to 100 mol-% of (B2), based on (B1) and (B2).

The polyorganosiloxanes (B) are preferably siloxane-soluble and, respectively, liquid at room temperature, i.e. preferably have less than 1000 siloxy units, i.e. have viscosities below 40,000 mPa·s at 25° C. at D=$s^{-1}$, preferably said polyorganosiloxanes having SiH groups have a viscosity of less than 1000 mPa·s at 25° C. and D=1 $s^{-1}$.

The chain length of the crosslinking agents as component (B2), which are mainly composed of MeHSiO units, is preferably from 3 to 200, particularly preferably being from 15 to 60 MeHSiO units.

The chain length of the chain extenders as component (B1), these being mainly composed of $Me_2SiO$ units and $HMe_2SiO_{1/2}$, is preferably from 2 to 200, particularly preferably being from 2 to 100 $Me_2SiO$ units.

The SiH-content in the present invention is determined by way of $^1$H NMR, see A. L. Smith (ed.): The Analytical Chemistry of Silicones, J. Wiley & Sons 1991 Vol. 112 pp. 356 et seq. in Chemical Analysis ed. by J. D. Winefordner.

The polyhydrogensiloxanes (B) can be prepared by processes known per se, e.g. using acidic equilibration or condensation, as disclosed by way of example in U.S. Pat. No. 5,536,803. The polyhydrogensiloxanes (B) can also be reaction products generated by a hydrosilylation reaction of organohydrosiloxanes using siloxanes containing smaller amounts of alkenyl groups in the presence of a hydrosilylation catalyst, where the resultant excess SiH content is preferably within the limits defined above. This gives organohydrogensiloxanes (B) bridged by alkylene groups such as $R^2$ groups.

The polyhydrogensiloxanes (B) can moreover also be reaction products which results from condensation of, e.g., organohydrogenalkoxysiloxanes (B) using hydroxy- or alkoxysilanes and, respectively, siloxanes, e.g. as described in U.S. Pat. No. 4,082,726; e.g. columns 5 and 6.

The preferred amount of the polyhydrogensiloxanes (B) is from 0.1 to 100 parts by weight, based on 100 parts by weight of component (A).

According to the invention, it is preferable to select the ratio of component (B) to component (A) in such a way wherein in the reactive silicone-based composition the molar ratio of the SiH- to the Si-alkenyl-groups is between 0.7 to 10, preferably from 1 to 3, most preferably 1.5 to 3.

The SiH-ratio has general impact on bath-life time and cure rate.

The catalyst (C) is selected from the group of hydrosilylation catalysts consisting of metals or metal compounds whereby the metal is selected from the group of nickel, palladium, platinum, rhodium, iridium, ruthenium and osmium or as taught in U.S. Pat. No. 3,159,601; U.S. Pat. No. 3,159,662; U.S. Pat. No. 3,419,593; U.S. Pat. No. 3,715,334; U.S. Pat. No. 3,775,452 and U.S. Pat. No. 3,814,730.

The amounts of these catalysts which are added to the compositions are from 0.5 to 500 ppm, preferably between 1 and 250 ppm, most preferably between 10 and 200 ppm based on the total weight of the catalyst metal and organosilicon compound (A) to (E). The preferred metal is platinum or is a platinum compound in any oxidation stage.

Broadly stated the catalyst component (C) facilitates the reaction of silicon-bonded hydrogen atoms with the silicon-bonded alkenyl radicals can be any platinum-containing catalyst component. For example this component can be platinum metal; a carrier such as silica gel or powdered charcoal, bearing platinum metal; or a compound or complex of a platinum metal.

A typical platinum-containing catalyst component in the organopolysiloxane compositions of this invention is any form of chloroplatinic acid, such as, for example, the readily available hexahydrate form or the anhydrous form, because of its easy dispersibility in organosiloxane systems. A particularly useful form of chloroplatinic acid is that composition obtained when it is reacted with an aliphatically unsaturated organosilicon compound such as divinyltetramethyl-disiloxane as disclosed by U.S. Pat. No. 3,419,593, incorporated herein by reference or tetravinyl-tetramethyl-tetracyclosiloxane.

The $Pt^0$-olefin complexes are especially preferred due to the highest possible cure rates in hydrosilylation one can achieve with such compounds.

The amount of platinum-containing catalyst component that is used in the compositions of this invention is not narrowly limited as long as there is a sufficient amount to accelerate the hydrosilylation between (A) and (B) at the desired temperature in the required time regime. The exact necessary amount of said catalyst component will depend upon the particular catalyst, the amount of other inhibiting compounds and the SiH:olefin ratio and is not easily predictable. Preferably one should add more than one part by weight of platinum for every one million parts by weight of the organosilicon components (A) and (B) to ensure curing in the presence of other undefined inhibiting traces. For the compositions of this invention, which are to be used by the coating method of this invention the amount of platinum containing catalyst component to be applied is preferably sufficient to provide from 1 to 500 ppm preferably 2 to 200 ppm, especially preferred 3 to 100 ppm by weight platinum per weight of polyorganosiloxane components (A) to (B). Preferably said amount is at least 10 ppm by weight per sum of (A) and (B) if a paper carrier is used as substrate for the siloxane release layer.

The hydrosilylation catalyst can also be selected from the group of photoactivatable catalysts.

These catalysts capable of being photoactivated preferably contain at least one metal selected from the group composed of Pt, Pd, Rh, Co, Ni, Ir or Ru. The photoactivatable catalyst preferably comprises platinum.

Photoactivatable catalysts are preferably selected among organometallic compounds, i.e., comprise carbon-containing ligands, or salts thereof. In a preferred embodiment photoactivatable catalyst (C2) has metal carbon bonds, including sigma- and pi-bonds. Preferably the photoactivatable catalyst (C) is an organometallic complex compound having at least one metal carbon sigma bond, still more preferably a platinum complex compound having preferably one or more sigma-bonded alkyl and/or aryl group, preferably alkyl group(s). Sigma-bonded ligands include in particular, sigma-bonded organic groups, preferably sigma-bonded $C_1$ to $C_6$-alkyl, more preferably sigma-bonded methyl groups, sigma-bonded aryl groups, like phenyl, sigma-bonded silyl groups, like trialkyl silyl groups. Most preferred photoactivatable catalyst include $\eta^5$-(optionally substituted)-cyclopentadienyl platinum complex compounds having sigma-bonded ligands, preferably sigma-bonded alkyl ligands.

Further photoactivatable catalysts include ($\eta$-diolefin)-(sigma-aryl)-platinum complexes (see e.g. U.S. Pat. No. 4,530,879).

The photoactivatable catalyst can be used as such or supported on a carrier.

The photo-activatable catalyst is a catalyst, which provides additional options to extend the bath-life time of the reactive silicon based composition obtained in step i), i.e. processing time prior to gelling of the components to form the reactive silicone-based composition once the components have been combined.

Examples of photoactivatable catalysts include $\eta$-diolefin-σ-aryl-platinum complexes, such as disclosed in U.S. Pat. No. 4,530,879, EP 122008, EP 146307 (corresponding to U.S. Pat. No. 4,510,094 and the prior art documents cited therein), or US 2003-0199603, and also platinum compounds whose reactivity can be controlled by way for example using azodicarboxylic esters, as disclosed in U.S. Pat. No. 4,640,939 or diketonates.

Photoactivatable platinum compounds that can be used are moreover those selected from the group having ligands selected from diketones, e.g. benzoyl-acetones or acetylene-dicarboxylic esters, and platinum catalysts embedded into photo-degradable organic resins. Other Pt-catalysts are mentioned by way of example in U.S. Pat. No. 3,715,334 or U.S. Pat. No. 3,419,593, EP 1 672 031 A1 and Lewis, Colborn, Grade, Bryant, Sumpter, and Scott in Organometallics, 1995, 14, 2202-2213, all incorporated by reference here.

Photo-activatable catalysts can also be formed in-situ in the silicone composition to be shaped, by using $Pt^0$-olefin complexes and adding appropriate photoactivatable ligands thereto.

$Pt^0$-olefin complexes are prepared by way of example in the presence of 1,3-divinyltetramethyldisiloxane ($M^{vi}_2$) via reduction of hexachloroplatinic acid or of other platinum chlorides.

The photo-activatable catalysts that can be used here are, however, not restricted to these above mentioned examples.

The most preferred photoactivatable catalysts to be used in the process of the invention are ($\eta^5$-cyclopentadienyl)-trimethyl-platinum, ($\eta^5$-cyclopentadienyl)-triphenyl-platinum complexes, in particular, ($\eta^5$-methylcyclopentadienyl)-trimethyl-platinum.

The amount of the photoactivatable catalysts is preferably 1-500 ppm and preferably in the same lower range as defined for the heat-activatable hydrosilylation catalysts mentioned above.

The inventive compositions may contain an appropriate amount of one or more inhibitors (D) controlling the cure rate and the bath-life time. The inhibitor (D) is applied in a sufficient amount in order to retard the hydrosilylation reaction at room temperature in order to enable mixing of the components (A) to (C) as well as the dispensing and coating step without prior curing.

On the other hand the cure rate after coating should be achieved in the shortest possible time after heat or light activation within seconds especially above 40° C. The inhibitor as component (D) in the compositions of this invention is any material that is known to be, or can be, used as an inhibitor for the catalytic activity of platinum group metal-containing catalysts. By the term "inhibitor" it is meant herein a material that retards the curing at room temperature of a curable mixture of the components (A), (B), and (C), when incorporated therein in small amounts, such as less than 2 wt. % based on the total weight of (A) to (B).

Inhibitors for the platinum group metal catalysts are well known in the organosilicon art. Examples of various classes of such metal catalyst inhibitors include unsaturated organic compounds such as ethylenically or aromatically unsaturated amides, U.S. Pat. No. 4,337,332; acetylenic compounds, U.S. Pat. No. 3,445,420 and U.S. Pat. No. 4,347,346; ethylenically unsaturated isocyanates, U.S. Pat. No. 3,882,083; olefinic siloxanes, U.S. Pat. No. 3,989,667; unsaturated hydrocarbon diesters, U.S. Pat. No. 4,256,870, U.S. Pat. No. 4,476,166 and U.S. Pat. No. 4,562,096, and conjugated eneynes. U.S. Pat. No. 4,465,818 and U.S. Pat. No. 4,472,563; other organic compounds such as hydroperoxides, U.S. Pat. No. 4,061,609; ketones, U.S. Pat. No. 3,418,731; sulfoxides, amines, phosphines, phosphites, nitriles, U.S. Pat. No. 3,344,111; diaziridines, U.S. Pat. No. 4,043,977; and various salts, such as U.S. Pat. No. 3,461,185. It is believed that the compositions of this invention can comprise an inhibitor from any of these classes of inhibitors. Examples thereof include the acetylenic alcohols of U.S. Pat. No. 3,445,420, such as ethynylcyclohexanol and methylbutynol; the unsaturated carboxylic esters of U.S. Pat. No. 4,256,870, such as diallylmaleate and dimethyl maleate; and the maleates and fumarates of U.S. Pat. No. 4,562,096 and U.S. Pat. No. 4,774,111, such as diethyl fumarate, diallyl fumarate and bis-(methoxyiso-propyl)maleate. The half esters and amides of U.S. Pat. No. 4,533,575; and the inhibitor mixtures of U.S. Pat. No. 4,476,166 would also be expected to behave similarly.

The above-mentioned patents relating to inhibitors for platinum group metal-containing catalysts are incorporated herein by reference to teach how to prepare compounds, which are suitable for the use as inhibitor component (D) in our compositions.

Preferred inhibitors for the compositions of this invention are the maleates and fumarates. The maleates and fumarates have the formula $R^1(OW)_nO_2CCH'CHCO_2(WO)_nR^{10}$ wherein $R^{10}$ denotes a monovalent hydro-carbon radical having from $C_1$ to $C_{10}$-atoms and each unit W denotes, independently, an divalent alkylene radical having from 2 to 4 carbon atoms. $R^{10}$ can be, for example, an $C_1$-$C_{10}$-alkyl radical such as methyl, ethyl, propyl, isopropyl, butyl, pentyl or hexyl, an aryl radical such as phenyl or benzyl, an alkenyl radical such as vinyl or allyl, alkynyl radicals, or a cyclohydrocarbon radical such as cyclohexyl. W can be, for example, $C_2$-$C_4$ divalent organic group like —$CH_2CH_2$—, —$CH_2(CH_3)$CH—, —$CH_2CH_2CH_2$—, —$CH_2CH_2CH_2CH_2$—, $CH_2(CH_3CH_2)$CH— and —$CH_2CH_2(CH_3)$CH—.

The amount of inhibitor component (D) to be used in the compositions of this invention is not critical and can be any amount that will retard the above-described platinum-catalyzed hydrosilylation reaction at room temperature while not preventing said reaction at moderately elevated temperature. No specific amount of inhibitor can be suggested to obtain a specified bath-life at room temperature since the desired amount of any particular inhibitor to be used will depend upon the concentration and type of the platinum group metal-containing catalyst and the nature and amounts of components (A) and (B).

The range of the inhibitor component (D) can be 0.0005 to 2 wt-.%, preferably 0.05 to 2 wt. %, and most preferably 0.1 to 1 wt. % for e.g. alkinoles based on the total weight of components (A) and (B).

The siloxane composition according to the invention may comprise further ingredients (E). The siloxane compositions according to the invention may also comprise further ingredients, like for example solvents (E), added to achieve better process properties for the inventive polymer composition (A) to (D).

If the compositions of the present invention optionally comprise solvents these solvents are usual organic solvents in the range of less than 10 wt.-%, preferably less than 5 wt.-% and most less than 1 wt.-% related to (A) to (D), because the invention based on aqueous emulsion aims to avoid any additional solvent, if these must be evaporated after coating and becomes part of the exhaust gases. If the solvent comprise reactive groups linkable to the polymers (A) or (B) these solvents can be used as component (E) in amounts beyond above limits for (E).

Appropriate reactive solvents can be selected from the group of olefinic hydro-carbons such as alpha-olefins, e.g. C8 to C25-alpha-olefins or preferably C14-C20-alpha-olefins. Mixtures of alpha-olefins can also be used.

Other additives falling under definition of component (E) are selected from the group of heat stabilzers, coloring compounds or pigments, antioxidants, biocides, fungicides, such as Preventol®, Katon®, Dowicil®, fillers, espec. spherical silsesquioxanes for getting additional antiblocking properties of release layers, anti-mist additives as disclosed in U.S. Pat. No. 6,586,535 or US 2003/0134043, anchorage additives, agents to control the pH-level, slipping agents as disclosed in EP 819735 A1, leveling agents and the like and further auxiliary components typical for silicone release compositions. These ingredients may be contained in said reactive silicone-based composition in a total amount of up to 20 wt. %.

The fillers used in inventive compositions are preferably selected from the groups of surface-modified fillers or spherically shape fillers. The fillers may serve as reinforcing fillers, thickening additive, as anti-blocking or anti-friction or matting additive.

The fillers include by way of example are all of the fine-particle fillers, i.e. those having particles smaller than 100 μm, i.e. preferably composed of such particles. These can be mineral fillers, such as silicates, carbonates, nitrides, oxides, carbon blacks, or silicas being fumed or precipitated silica, whose BET-surface areas are from 0.3 to 400 m²/g, these preferably having been specifically surface-hydrophobicized here. Preferred silicas are, for example, Aerosil® 200, 300, HDK® N20 or T30, Cab-O-Sil® MS 7 or HS 5 more than 200 m²/g BET surface area or precipitated silicas, or wet silicas, are Vulkasil®VN3, or FK 160 from Degussa, or Nipsil®LP from Nippon Silica K.K. and others. Examples of commercially available silicas pre-hydrophobized with various silanes are: Aerosil R 972, R 974, R 976, or R 812, or, for example, HDK® 2000 or HDK® H30, names for materials known as hydrophobized precipitated silicas or wet silicas are Sipernat®D10 or D15 from Degussa.

Surfaced treated fillers having low BET-values are preferred because the ability to build up shear thinning effects is reduced. The preferred surface treatment can be achieved with polyorganosiloxanediols, polyorganosiloxanes, chloro or alkoxysilanes which allows a certain concentration of fillers having lowest degree of thickening properties and shear thinning.

Another class of fillers serving as non-transparent non-reinforcing fillers are powdered quartz, diatomaceous earths, powdered crystobalites, micas, aluminum oxides, aluminum hydroxides, oxides and salts of Fe, Mn, Ti, Zn, Zr, chalks, or carbon blacks whose BET-surface areas are from 0.3 to 50 $m^2/g$.

These fillers are available under variety of trade names, examples being Sicron®, Min-U-Sil®, Dicalite®, Crystallite® and serve as matting agents.

This type of filler especially if the particles have a spherical shape can preferably be used as anti-blocking agents in the release layer and can give an especially soft touch of the surface layer.

Such filler are selected from the group of spherical particles based on silicas, thermoplastic powders such as PTFE powders, PTFE emulsions or polyamide polyurethane or silsesquioxanes powders, cured silicone elastomers or resins are used in amounts of up to 10 wt. %. Tradenames are Teflon® emulsions, Nylon® powders, Tospearl®, Acemat® etc.

Heat stabilizers can be selected from the group of metal compounds, organic or inorganic salts, complexes of Ce, Fe, La, Mn, Ti and Zr.

Levelling agents are selected from the group consisting of polyether-siloxanes, polyols, polyethers, polyhalides, fatty alcohol or fluoroalkyl derivatives.

Another class of the conventional additives (E) are additives which can improve rheological properties such as thickening additives without essential surface active properties. Examples of said non-essential components include viscosity-increasing additives, such as carboxymethyl cellulose, hydroxyethyl cellulose and sodium alginates.

The component (F) are emulsifiers which are selected from the group of surface active compounds, whereby at least one such emulsifier is a polymeric emulsifier. Such emulsifiers are in general used to mix and disperse the oily phase of components (A) to (E) with water in step ii).

In principle, component (F) includes all the emulsifiers suitable for the formation of droplets in a continuous aqueous carrier matrix and the stabilization of this emulsion.

The quantity of the emulsifiers (F) should preferably not exceed 20 wt.-%, based on the total of components (A) to (E).

The emulsifiers preferably are selected from the group which consists of all non-ionic emulsifiers such as alkylphenoxy ethers, polyoxyalkylene glycols, polyoxyalkylene sorbitan monooleates, polyvinylalcohols, polyvinylesters, polyethersiloxanes and sorbitan stearates, cationic emulsifiers such as alkyl, aryl, polyethoxylated quaternary ammonium salts such as polyethoxylated quaternary ammonium chloride.

Other ionic surfactants, are preferably anionic surfactants, which can be employed are, e.g., alkyl- or aryl-, alkylarylsulphates, sulphonates, phosphates, sulpho-succinates, sulphosuccinamates, sulphoacetates or amino acid derivatives.

This list is not exhaustive of emulsifying agents presently employed for silicones. Most preferred are polymeric emulsifiers, such a polyvinylalcohols, polyvinylesters, or partially hydrolyzed polyvinylesters and the corresponding copolymers with ethylene, propylene, acrylic acid or other unsaturated organic monomers.

Generally the emulsifier is added at a ratio of the oil phase ranging from about 0.05 wt. % to about 20 wt.-% of (A) to (E).

Without bond to any theory one might assume that these emulsifiers can also work as protective colloid type, in addition to their emulsifying function. These protective colloids, such as PVAs, can also be active as promoters of anti-adhesiveness, of water repellency, indeed even of printability, as regards the field of paper anti-adhesiveness.

In the event that the emulsions according to the invention are used for the preparation of release coatings in the foodstuff sector, it is preferred to use emulsifiers that are mentioned in the FDA Regulations 176.170 "Components of Paper and Paperboard".

Suitable emulsifiers and thickeners (F) are further selected from the group consisting of:

C8-C22-alkyldimethylbenzylammonium chloride, preferably at most 1.5 wt. %, sodium lauryl sulphate, preferably at most 0.5 wt.-%, polyethylene glycol ethers of monohydric aliphatic alcohols C12-C20 and C2-C9-alkyl phenols, or polyethylene glycol esters of natural fatty acids C8-C22 and vegetable oils.

The most preferred polymeric emulsifiers are polyvinylalcohols such as partially acetylated polyvinyl alcohol with less than 20 mol. % acetyl groups and a K-value of more than 40. The K-value is a measure for the polymerization degree determined by Staudinger Index (viscosity eta at infinite dilution) $eta_{c\infty}=2.302*(75*n^2+n)$ whereby $n=K/1000$. A currently more preferred description is an equation for the average degree of polymerization $P_w=M_w/(86-0.42*degree\ of\ hydrolysis)$, wherein $M_w$ is the weight average mol mass.

Polyvinylalcohols (PVA) as emulsifiers are compounds obtained from their corresponding esters, in particular polyvinyl acetate, by hydrolysis in aqueous medium or by alcoholysis in anhydrous medium. The precursors as starting material used in praxis are commonly polyvinyl acetates. The hydrolysis of these esters resulting in PVAs is generally incomplete. Acyl groups remain in the molecule, this proportion influences the properties of the PVA, in particular its solubility. One characterization of PVAs is therefore the indication of the ester number or degree of hydrolysis. The ester number can be determined by known methods, e.g. by neutralization of any acid present in the polyvinyl alcohol after saponification of the acyl groups and titration of the excess from alkaline saponification.

Another method for the description of the polyvinyl alcohols is the degree of polymerization or condensation, which can be determined by measuring the dynamic viscosity (cP/cps (centipoise) or mPa·s) $eta_{c\infty}$ of a defined dilution. The viscosity $eta_{c\infty}$ corresponds to the dynamic viscosity coefficient of a aqueous solution of 4 wt.-% of a PVA at 20±5° C. using an capillary (Ostwald) viscometer.

One preferred class of non-ionic emulsifier as component (F) of this invention are polyvinylalcohols (PVA) having preferably a degree of hydrolysis of 70 to 99 mol.-%, more preferably 80 to 90 and most preferably from 86 to 89 mol.-%. It has been discovered that a cured coating has the lowest release force, highest gloss, if an appropriate viscosity or a related degree of hydrolysis of the PVA emulsifier is selected. The highest gloss may be achieved with a degree of hydrolysis of at least 90 mol.-%, the optimum of gloss and lowest release forces if the degree of hydrolysis is at least 80 mol.-% preferably between 85-90 mol. %. Preferred PVA emulsifiers have a range of viscosity of an aqueous solution containing 4 wt.-% of the PVA of from 3 to 150 mPa·s at 20° C., more preferred 6 to 130 mPa·s at 20° C. and most preferred greater than 15 mPa·s at 20° C., most preferred greater than 30 mPa·s. The weight-average molecular weights ($M_w$) of the PVA emulsifiers preferably are between 150 to 250,000 g/mol, more preferably 30,000-250,000 g/mol most preferred >50,000 to 250,000 g/mol.

The molecular weight of the PVA has impact on the desired gloss and release forces against adhesives. The molecular weight depends on the degree of hydrolysis and viscosity of the PVA.

The amount of PVA that may be used in the compositions is typically from about 0.5 to 20 wt. %, preferably 1-5 wt. % based on the total of components (A) to (E).

In a preferred embodiment a PVA emulsifier is used together with smaller amounts of a second non-ionic or ionic emulsifier selected from anionic or cationic surfactants. The second emulsifier may be employed in a proportion of 0.05 to 10 parts, preferably from 0.1 to 5 parts, per 100 parts of components (A) to (E).

If a second emulsifier is used then it can be selected from nonionic emulsifiers, different than PVA which are selected from the group of C1 to C15-alkylphenyl derivatives, fatty alcohols glycol alkyl ethers, or fatty acids carrying alkylene oxide groups, such as ethylene or propylene oxide, e.g. nonylphenyl comprising between 9 and 30 ethylene oxide (EO) units or oleic acid with 2 to 8 EO units.

These surfactants are available by example as Cemulsol® O.N 10-20 available at Rhodia or Tergipol® NP-40 available at Crompton formerly Union Carbide Corporation, or as Arkopal formerly from Hoechst, e.g. N-150 a nonylphenyl polyglycol ether having on average 15 glycol units.

The tradenames of such polyvinyl alcohols e.g. granular solid polymers Rhodoviol® 25/140 marketed by Rhodia or Elvanol® 50-42 available from DuPont. Mowiol® from Kuraray such as x-88, Celvol® such as Celvol 540 from Celanese Pluvial® or Pluviol from Wacker, Airvol® such as Airvol 540 from Air Products.

The combination of a polyvinyl alcohol with anionic and cationic emulsifiers is another preferred embodiment, preferred are here sodium alkyl- or alkylaryl-sulphates, most preferably laurylsulfate.

The liquid carrier the continuous phase of the emulsion which represents the essential component of the composition, is water, preferably clear water, and most preferably distilled and/or deionized water.

The coated substrate obtained after processing the steps i) to iii) comprises a silicone release layer, where the coated substrate can serve as carrier layer for tacky or adhesive materials, which have to be peeled off with low and defined forces and whereby the adhesive properties are not impaired by remaining silicone residues.

Such release layers are particular useful in processes for cooking cakes, breds and all kind of bakeries, whereby the substrate is used as bakery paper for the separation of bakery ware after the cooking process.

Another type of a reactive silicone-based composition that can be processed with the process of the present invention uses another curing mechanism than hydrosilylation. Such mechanism involves the condensation using organometal catalysts and/or acid or basic catalysts.

Other Embodiments

Suitable compositions basing on condensation curing are comprised of
(A4) one or more polyorganosiloxanes having in average at least two SiOH groups as reactive groups,
(B4) one or more polyorganosiloxanes having in average at least two reactive hydrolysable groups attached to Si,
(C4) one or more condensation catalyst,
(D4) optionally one or more retarder for the condensation reaction,
(E4) optionally one or more auxiliary agents,
(F4) optionally one or more emulsifiers.

These components can be mixed for example in the following ranges:
100 part per weigths (pw) of component(s) (A4),
0.2 to 100 pw of component(s) (B4)
0.1 to 5 pw of component(s) (C4) which corresponds to 10-10000 ppm related to metal or active compound,
0-0.5 pw of component(s) (D4) controlling the cure rate
0-15 pw of auxiliary agent(s) (E4)
0-20 pw of emulsifier(s) (F4).

Components (A4) to (E4):

The siloxane polymers corresponding to condensable component (A4) contain groups which can undergo condensation reactions, because the reactive groups are condensable with one another or can react with other reactive, i.e. hydrolysable leaving groups like hydroxy, alkoxy, aryloxy, alkylcarboxy, amino, amido groups attached to silicon and the like. The preferred condensable groups are SiOH groups. The polymers (A4) are preferably SiOH-terminated polydimethylsiloxanes, whereby these polymers have preferably terminal groups of the type of HOMe$_2$Si-units.

Such polymers are disclosed for example in U.S. Pat. No. 3,527,659, DE 15 46 410, DE 21 35 673 or DE 27 48 406, U.S. Pat. No. 3,579,469.

For example the polymer (A4) can be described by the general formula (III),

$$[M_{a3}D_{b3}T_{c3}Q_{d3}]_{m3} \qquad (III)$$

wherein the polysiloxane (A4) is defined by following indices:
m3=1-1000
a3=1-10
b3=0-2000
c3=0-50
d3=0-1, and wherein
M=R$^5_3$SiO$_{1/2}$, D=R$^5_2$SiO$_{2/2}$, T=R$^5$SiO$_{3/2}$, Q=SiO$_{4/2}$,
wherein
R$^5$ includes non-condensable groups R$^6$ preferably selected from n-, iso-, tertiary- or C$_1$-C$_{30}$-alkyl, C$_1$-C$_{12}$-alkoxy(C$_1$-C$_{12}$)alkyl, C$_5$-C$_{30}$-cyclic alkyl, C$_6$-C$_{30}$-aryl, C$_7$-C$_{30}$-alkylaryl, which can contain one or more O-, N-, S- and/or F-atoms, resulting for example in ethers groups, including poly(C$_2$-C$_4$-alkylene)ethers with up to 1000 alkyleneoxy units, and condensable groups R$^7$ which are hydroxy groups,
with the proviso that at least two groups R$^5$ represent a condensable group R$^7$.

Suitable examples of R$^6$ which are not condensable include alkyl radicals, preferably CH$_3$—, CH$_3$CH$_2$—, (CH$_3$)$_2$CH—, C$_8$H$_{17}$— and C$_{10}$H$_{21}$—, cycloaliphatic radicals, such as cyclohexylethyl, limonenyl, aryl radicals, such as phenyl, tolyl, xylyl, aralkyl radicals, such as benzyl and 2-phenylethyl, fluoroalkyl groups, such as C$_n$F$_{2n+1}$CH$_2$CH$_2$— wherein n has a value of from 1 to 10, such as, for example, CF$_3$CH$_2$CH$_2$—, C$_4$F$_9$CH$_2$CH$_2$— and C$_6$F$_{13}$CH$_2$CH$_2$—. Particularly preferred groups for R$^6$ are methyl, phenyl, 3,3,3-trifluoropropyl.

Additionally divalent R$^2$-groups may be present in component (A4), that connect units M, D, T or Q. Suitable R$^2$-groups are the same as mentioned above.

Preferred components (A4) have the formula:

$$R^7R^6{}_2SiO(R^6{}_2SiO)_{b3}SiR^6{}_2R^7 \quad (IIIa)$$

wherein
b3 is as defined above,
$R^7$ is hydroxy, and $R^6$ as defined above.

The indices represent the average polymerization degree $P_n$ based on the average number molecular mass.

The content of the T- and Q-units if present does not exceed 10 mol. % of all siloxy units. This means the polymer is preferably a linear, flowable fluid with a Newton like viscosity but not solid at 25° C. and shear rates of $D=1\ s^{-1}$.

The average polymerization degree $P_n$ or 'b3' is based on $M_n$ as number average mol mass in the range of up to 2000, the preferred range is 500 to 5000. The viscosities of such polymers are in the range of 10 to 400,000 mPa·s at 25° C. at a shear rate of $D=1\ s^{-1}$, the preferred range is about 200 to 100,000 mPa·s.

The concentration of SiOH groups is in the range of 6.0 to 0.1 mol. %, preferably 4.0-0.2 mol. % related to the total number of the silicon atoms.

Due to the lower reaction rate of the condensation step in the condensation-based reactive silicone-based composition the hydrosilylation based reactive silicone-based composition is preferred.

The component (B4) acts as crosslinker, which enables the cure of the polymers of the type (A4) comprising reactive groups $R^7$, which can undergo condensation reactions with the SiOH-groups of (A4) in the presence of catalysts (C4) and water.

These reactive groups $R^8$ of component (B4) are groups which are able to participate in the main network building reaction together with the polymer (A4).

Broadly stated, component (B4) may include any reactive organosilicon compound with condensable groups $R^8$ that optionally contain one or more silicon atoms linked by divalent groups $R^2$. Examples of said divalent groups $R^2$ are defined above.

The silicon atoms can comprise other additional groups $R^6$ as long as the total molecule comprises 2 or more than 2 reactive groups $R^8$ to be reactive with (A4). This means the polymer (B4) can be described for example by the general formula (IV), $$[M_{a4}D_{b4}T_{c4}Q_{d4}]_{m4} \quad (IV)$$

wherein the siloxy units can be distributed blockwise or randomly in the polymer chain. Within a polysiloxane chain each siloxane unit can be identical or different and
m4=1-500
a4=1-10
b4=0-500
c4=0-50
d4=0-1.

The aforementioned indices represent the average polymerisation degrees based on the number average mol mass $M_n$.

The siloxane units are selected from the groups:
$M=R^9{}_3SiO_{1/2}$, $D=R^9{}_2SiO_{2/2}$, $T=R^9SiO_{3/2}$, $SiO_{4/2}$,
wherein $R^9$ is selected from $R^6$ and $R^8$, wherein $R^6$ is as defined above and $R^8$ is selected from $R^7$ hydrogen, n-, iso-, tertiary- or cyclo-$C_1$-$C_6$-alkoxy, such as methoxy, ethoxy, propoxy, carboxy, such acetoxy, alkylamido, benzamido, alkyloximo such as butanonoxime, alkenyloxy such as propenoxy, halogenhydrocarbon, halogen, pseudohalogen, aryloxy,
with the proviso that the siloxanes comprise at least two groups $R^8$.

In polymer (B4) of the formula (IV) the range of the indices for M-, D-, T- and Q-units present in the molecule can be such that the polymers cover flowable polymers. It is preferred to use liquid silanes or siloxanes comprising $C_1$-$C_6$-alkoxy groups having a low molecular weight and their condensation products which can be partially hydrolyzed.

The siloxane units with radicals $R^6$ or $R^8$ can be equal or different for each silicon atom. Each molecule can bear one or more group(s) $R^6$ or $R^8$ independently.

In another preferred embodiment the component (B4) can be a monomeric silane of the general formula $R^6{}_eSiR^8{}_{(4-e)}$ wherein e=0 or 2.

The preferred structures of reactive polyorganosiloxanes for component (B4) are silanes or condensed silanes/siloxanes of formula (IIIa) to (IIId).

$$R^6{}_fSi(R^{12}O)_{(4-f)} \text{ wherein } f=0, 1, 2, 3 \text{ or } 4 \quad (IIIa)$$

$$\{[SiO_{4/2}][R^{12}O_{1/2}]_{n4}\}_{m4} \quad (IIIb)$$

$$\{[RSiO_{3/2}][R^{12}O_{1/2}]_{n4}\}_{m4} \quad (IIIc)$$

$$\{[SiO_{4/2}][R^{12}O_{1/2}]_{n4}[R^6{}_2R^8SiO_{1/2}]_{0.01-10}\\ [R^8SiO_{3/2}]_{0-50}[R^6R^8SiO_{2/2}]_{0-500}\}_{m4} \quad (IIId)$$

wherein $R^6$ and $R^8$ are as defined above, $R^{12}O_{1/2}$ is an $C_1$-$C_6$-alkoxy, e.g. methoxy or ethoxy with the preferred indices
m4=1 to 100
n4=0.01 to 4.

The monomeric or polymeric components (B4) can be applied as single component or as mixture of different types of (B4).

The molecular weight in (B4) is preferably smaller than of (A4), the functionality in (B4) per molecule is preferably higher than in (A4).

It is preferred that the polyorganosiloxane component (B4) has a viscosity at 25° C. of more than 1 mPa·s, i.e 1 to 2000 mPa·s in the case of $R^6$=methyl. The crosslinker (B4) should have preferably at least more than 2 reactive groups $R^8$ per molecule.

The concentration of the reactive group $R^8$ in the polydimethylsiloxanes and silanes as component (B) is preferably in the range of 0.1 to 400 mol.-% (related to the Si-atoms), more preferably 10 to 400 mol. % (for example in a tetraalkoxy silane as component (B4) the concentration is 400 mol. %).

The weight ratio of the crosslinker (B4) to polymer (A4) can be adjusted by calculating the molar ratio of reactive groups in (B4) and (A4). It is preferred to have an excess of reactive groups in (B4). Preferably the molar ratio of the reactive groups in component (B4) to the reactive groups in component (A4) is 1 to 20:1 to ensure a certain level of multifunctional structures in the cured network.

The curing of the reactive silicone-based composition including the condensable base polymer (A4) can be catalyzed by compounds of the type (C4). The catalysts (C4) are selected from the group of a variety of organometallic compounds preferably organotin, titanium, zinc, calcium compounds but one can also use Lewis acids or Broensted acids or basis, preferred acids and basis are such types with low vapour pressure, $C_1$-$C_8$-carboxylic acids or $C_1$-$C_8$-alkylamines.

A preferred class of organometal compounds are salts like dialkyltin oxides, reaction products of dialkyl tin oxide with tetraalkoxysilanes, dibutyl tin dilaurate, stannous octoate, dibutyltin dioctoate, zinc octoate, tetraalkoxy titanates or alkoxy titanium chelates of $C_1$-$C_{10}$-carboxylic acid residues, etc. Based on the silanol chain-stopped polymer (A4), there should be e.g. from 0.3 wt.-% to 10 wt.-% of the tin catalyst (as metal) relative to components (A4) to (E4). Below the level of 0.3%, sufficiently rapid cure at low temperatures is sometimes not achieved. Other examples of such catalysts are primary, secondary, tertiary amines, preferably with dissociation constants of at least $10^{-10}$, condensation products of an aliphatic aldehyde with a primary amine, carboxylic acid salts of metals like titanate esters, and alkali metal phenoxides. Specific examples of such catalysts are set forth in column 3, lines 19-54 of U.S. Pat. No. 3,527,659, the disclosure which is incorporated herein by reference for the benefit of those unfamiliar in this art. A particular useful curing catalyst for polymers (A4) of this invention are quaternary ammonium salts such as benzyltrimethylammonium compounds like acetate, tetraalkylammonium acetate or other see U.S. Pat. No. 3,819,745.

If necessary to control the impact of the catalyst (C4) on the rate of hydrolysis one can use a catalyst retarder or accelerator (D4). The compound (D4) can be selected from the group which consists of any complex building ligand delivering molecule, or stabilizer selected from LEWIS acids or bases especially S-, P-, N-containing compounds such organophosphates, phosphites, phosphonates, sulfates, amines, S-, P-, N-aromatic heterocycles, polycarboxylic and amino acids. If these compounds change the pH to more than 8 or less than 4 in the reactive silicone-based compositions, they will work more as an accelerator for the condensation reaction.

Regarding components (E4) and (F4) it can be referred to those which are mentioned for the hydrosilylation system (components (E) and (F).

The inventive process comprises finally a method of preparing an aqueous emulsion of a reactive silicone-based composition, which comprises the steps of:
i) mixing components to form the reactive, that is, curable silicone-based composition,
ii) mixing said reactive silicone-based composition with water to form the aqueous emulsion of said reactive, i.e. curable silicone-based composition.

The inventors discovered that reactive components (A) to (E) of a silicone composition preferably curable by hydrosilylation can be dispersed to a stable aqueous emulsion, if the components are first mixed without the aqueous carrier and preferably then dispersed under assistance of an emulsifier (F). Such emulsion can be dispensed on rolls and spread to curable films preferably if the process times after unification of the components (A) to (F), i.e. forming the reactive silicone-based composition, are below of 10 h at temperatures below 40° C.

EXAMPLES

Test Methods:

The release layers on any of the substrates are evaluated by measuring its release force in accordance with FINAT test method No. 3 and for the residual adhesive force of the adhesion layer after contact with silicone release layer in accordance with FINAT test method No. 10 or 11 in order to evaluate one kind of smear. The residual adhesive force is measured with the adhesive "Tesa 4154". The release forces are measured in relation to acrylic adhesives obtainable under the designation "Tesa® 7475", rubber adhesives available under the designation "Tesa® 7476" and "Tesa® 4154", each from the company Beiersdorf, Hamburg. FINAT No. 7 determines the coating weight.

The Rubb-Off and Smear was determined in addition by rubbing with certain pressure (1 N) on the coating with a finger and observing for the absence of haze in the rubbed area.

The no-rub-off condition was determined by vigorously rubbing (1 N) the coating with the index finger and noting that the coating could not be removed from the paper even partly.

The term cure time and bath-life time are defined above in the description as curing time at 120° C. and a viscosity increase at 40° C.

The reactivity of the reactive silicone compositions, which are free of water and which do not include component (F), can also be evaluated by Differential Scanning Calorimetry (DSC). Such DSC-spectra are measured with a Mettler Toledo DSC 12E apparatus. The sample size was 8 mg of the water-free composition (A) to (E). The starting temperature is 30° C. and ends at 170° C. with a heating rate/increase of 10° K/min.

The calculated temperature $T_{onset}$ as starting point for heat development in a DSC measurement is defined to be the point of intersection of a straight line which follows best the tangent in the turning point in the upgrade of the function representing the heat development and the base line. The temperature ($T_{onset}$) is the point of intersection of that tangent line and the base line of the DSC curve under the applied heating rate.

Example 1

Preparation of the Reactive Silicone-Based Water-Free Oil Phase Composition of Step i):

100 parts per weight (pw) of a vinyl end-stopped polydimethylsiloxane of around 250 mPa·s at 25° C. (vinyl content=0.22 mmol/g (about 1.6 mol-%)) of the general formula $M^{vi}{}_2$-$D_{120}$ as component (A), 5.5 parts of a polymethylhydrogensiloxane of the formula $Me_3SiO(Me_2SiO)_{15}(MeHSiO)_{30}SiMe_3$ having a viscosity of 30 mPa·s at 25° C. as component (B) providing a molar SiH/SiVi ratio of 2.5 in the components (A) and (B), 0.4 pw of an inhibitor as component (D), which is diallyl maleate, and a $Pt^0$-complex having vinylsiloxane ligands (Pt-Karstedt catalyst) providing 100 ppm of platinum related to (A) and (B) as component (C) are mixed together at 25° C. in a polyethylene beaker with a kitchen mixer (Krups etc.).

The mixture shows a curing time at 120° C. of less than 30 sec on a Honey glassine paper of 60 g/m² from Tervasaari applying a coating weight of 1 g/m² and showing a bath-life time at 40° C. of 5 h, wherein the viscosity increased on the twofold of the starting value. The temperature calculated as $T_{onset}$ in a DSC measurement was ca. 95.8° C.

This example illustrates how to achieve curing times and bath-life times in the preferred time regime.

Example 2

Preparation of a Reactive Emulsion of Step ii)

60 g of a water phase containing polyvinyl alcohol (PVA) as component (F) in an amount to provide 2 wt.-% of PVA in the total aqueous emulsion and 40 g of the reactive composition containing components (A) to (D), obtained in example 1, are mixed together. The PVA-type of this example is Mowiol® 5-88 ((—CH₂—CH(OH)—)$_n$), a partially hydrolyzed polyvinylacetate having a degree of hydrolysis of 88 mol. % and having a viscosity of 5.5 mPa·s at 25° C. (4 wt.-% aqueous solution).

The emulsion was made by incorporation of the reactive silicone-based composition into the water-phase in two minutes while mixing with an Ultra-Turrax high shear mixer at highest speed (4000 rpm) in a 1500 ml beaker of 14 cm height. During this mixing time the temperature of the emulsion rose to a maximum of 36° C. The amount of solids in the end-emulsion was 42 wt.-%+/−2 wt.-%.

This example illustrates how to achieve an emulsion using a low viscous emulsifier.

Example 3

60 g of a water phase contained that much of polyvinyl alcohol (PVA) as component (F) to provide an amount of 2 wt.-% of PVA in the final emulsion and 40 g of the reactive composition (A) to (D) of example 1 are mixed together. The PVA-type in this example is Celvol® 540, a partially hydrolyzed polyvinylacetate having a degree of hydrolysis of 88 mol. % and a viscosity of 50 mPa·s at 25° C. (4 wt.-% aqueous solution).

The emulsion was made by incorporation of the reactive silicone-based composition into the water-phase in two minutes while mixing with an Ultra-Turrax high shear mixer at highest speed (4000 rpm) in a 1500 ml beaker of 14 cm height. During this mixing time the temperature of the emulsion rose to a maximum of 36° C. The amount of solids in the end-emulsion was 42 wt.-%+/−2 wt.-%.

This example illustrates how to achieve an emulsion using a high viscous emulsifier, which is preferred.

Example 4

The reactive silicone-based composition was made with 3.3 pw of polymethylhydrogensiloxane of the formula $Me_3SiO(Me_2SiO)_{15}$-$(MeHSiO)_{30}SiMe_3$ instead of 5.5 pw of the polymethylhydrogensiloxane used in Example 1 providing a SiH:SiVi ratio of 1.5:1 of the components (A) and (B).

The mixture has a curing time at 120° C. of less than 30 sec on the paper used in example 1 showing a coating weight of 1 g/m² and a bath-life time at 40° C. of 6 h.

The temperature calculated as $T_{onset}$ in a DSC measurement was ca. 95.8° C. This example illustrates how to achieve curing times and bath-life times in the preferred time regime with a composition having a smaller ratio of SiH:Si-alkenyl. The smaller SiH-ratio compared to example 2 enlarges the bath-life time. Other differences are detectable in the coating process as shown below.

Example 5

60 g of a water phase contained that much of polyvinyl alcohol (PVA) as component (F) to provide an amount of 1 wt.-% of PVA in the final emulsion and 40 g of the reactive composition (A) to (D) of example 4 are mixed together. The PVA-type is Mowiol 5-88®, a partially hydrolyzed polyvinylacetate having a degree of hydrolysis of 88 mol. % and a 4 wt.-% aqueous solution viscosity of 5.5 mPa·s at 25° C.

During this mixing time the temperature of the emulsion rose up to 36° C. maximum. The amount of solids in the final emulsion was 42 wt.-%+/−2 wt.-%.

Example 6

60 g of a water phase contained that much of polyvinyl alcohol (PVA) as component (F) to provide an amount of 1 wt.-% of PVA in the final emulsion and 40 g of the reactive composition (A) to (D) of example 4 are mixed together. The PVA-type is Celvol® 540, a hydrolyzed PV-Acetate having a degree of hydrolysis of 88 mol. % and a 4 wt.-% aqueous solution viscosity of 50 mPa·s at 25° C.

During mixing the temperature of the emulsion rose to 36° C. maximum. The amount of solids in the end-emulsion was 42 wt.-%+/−2 wt.-%.

Example 7

Coating Procedure to Test the Emulsion as Release Coating on Paper

The aqueous emulsions prepared in the examples 2-3 and 5-6 were coated with an adjusted Mayer Bar allowing a higher wet coating weight as in Example 1 on a standard glassine paper from Tervasaari, a Honey glassine paper of 60 g/m². The curing time of the aqueous coating was completed at 120° C. in less than 30 seconds. The dry coat weight determined after curing was measured to be 1 g/m².

The Tesa® tapes 7476 and 7475 were affixed to the cured silicone surface obtained before (acc. to Finat test No. 3), and the taped release liners were aged for 24 hours at room temperature. The force required to peel away the Tesa tape from the silicone surface through an angle of 180° at 300 mm/min was determined in cN/inch (Tesa® tapes have a width of 1 inch). The results are given below in table 1.

TABLE 1

| Example | Cure )* (s) | Release Tesa 7476 (cN/inch) | Release Tesa 7475 (cN/inch) |
|---------|-------------|------------------------------|------------------------------|
| 2 | 30 | 382 | 615 |
| 3 | 30 | 144 | 45.5 |
| 5 | 30 | 230 | 255 |
| 6 | 30 | 95.9 | 59.1 |

)* cure defined as smear- and migration-free (versus Tesa 4154 tape) on the silicone coating.

The performance of the coatings from example 3 and 6 proved to be satisfactory from both the release performance and the cure point of view while the release force observed in both the examples 2 and 5 proved to be very high. A release value of higher than 200 cN/inch is less preferred.

It shows that the viscosity of the PVA used as an emulsifier should be preferably higher than 5.5 mPa·s.

Example 8 (Comparison-Example)

(Shelf Life of the SiH-Component of a 'Two-Part'-Emulsion System)

This example shows the storage stability of an SiH-emulsion according to the state of the art The example illustrates the manufacture of an aqueous emulsion of a non-reactive silicone-based composition wherein the catalyst component (C) is omitted:

100 pw of a vinyl end-stopped polydimethylsiloxane of around 250 mPa·s at 25° C., (vinyl content=0.22 mmol/g) of the general formula $M^{vi}_2$-$D_{120}$ as component (A), 5.5 pw of a polymethylhydrogensiloxane of the formula $Me_3SiO$ $(Me_2SiO)_{15}(MeHSiO)_{30}SiMe_3$ (30 mPa·s at 25° C.) as component (B) providing a molar SiH/SiVi ratio of 2.5, and 0.4 pw inhibitor as component (D), which is the diallylmaleate were mixed together with a kitchen mixer. This mixture is called the 'oil phase'.

60 parts of a water phase containing that much of polyvinyl alcohol (PVA) as component (F) to provide an amount of 2 wt.-% of PVA in the completed emulsion and 40 g of the oil phase composition are mixed together.

The PVA-type in this example is Celvol® 540, an hydrolysed PVA having a degree of hydrolysis of 88 mol. % and a 4 wt. % aqueous solution viscosity of 50 mPa·s at 25° C.

The emulsion was made by addition of the oil-phase to the water-phase in two minutes while mixing with an Ultra-Turrax high shear mixer. During this mixing time the temperature of the emulsion rose to 36° C. maximum. The amount of solids in the end-emulsion was targeted at 42 wt.-%+/−2 wt.-%.

This emulsion named (Em1a) was separated in two parts.

Directly after making the emulsion (Em1a) a coating was made with this emulsion by admixing this emulsion with an emulsified second composition containing 100 parts p.wt. of the aforementioned vinyl end-stopped polydimethylsiloxanes (A) and the component (C) of example 1 named (Em2) in a ratio of 10:1 adjusting a platinum concentration in the mixture of 75 ppm Pt.

The other part of emulsion (Em1a) was stored for 100 days and called (Em1b).

The emulsions (Em1a) and (Em2) as well as (Em1b) and (Em2) were mixed in a ratio of 10:1 achieving an Pt-conc. of 75 ppm Pt related to the solid silicone phase respectively.

The coating was made on a Tervasaari Honey glassine paper of 60 g/m$^2$ by making a draw down of the emulsion with a knife and curing it in an oven for 30 s at 120° C. The curing was tested by checking smear on the coating. The smear was testing by rubbing with a finger with a pressure of 1 N.

The freshly made emulsion comprised of (Em1a) and (Em2) showed full cure and no smear while the aged emulsion (Em1b) and (Em2) stored 100 days at 25° C. showed incomplete cure at 120° C. after 30 s and smear and rubb-off of the coating.

The SiH-content according to a titration of active hydrogen of the emulsion (Em1b) decreased from 0.184 mmol SiH/g emulsion to 0.128 mmol SiH/g in this period of 100 days, which corresponds to a loss of 30 mol. %. This SiH-content was determined by titration of the emulsion (Em1b) with (tert.-butanol)-potassium and the measurement of the amount of hydrogen evacuating from that mixture.

Example 9

('One-Part'-Emulsion with Non-Ionic Emulsifiers)

60 g of a water phase contained 0.67 gram of a nonylphenol ethoxylate with 30 EO units and 1.62 gram of a secondary C11-C15-alcohol ethoxylate with 7 EO units and 40 g of the reactive composition (A) to (D) of example 1 are mixed together. The ethoxylates in this example used are the Tergitol NP-30 and Tergitol 15-S-7 respectively.

The emulsion was made by incorporation of the reactive silicone-based composition into the water-phase in two minutes while mixing with an Ultra-Turrax high shear mixer at highest speed (4000 rpm) in a 1500 nil beaker of 14 cm height. During this mixing time the temperature of the emulsion rose to a maximum of 36° C. The amount of solids in the end-emulsion was 42 wt.-%+/−2 wt.-%.

Example 10 (Comparative Example)

'Two-Part'-Emulsion with Non-Ionic Emulsifiers—'Crosslinker (SiH)-Emulsion)

60 g of a water phase contained 0.67 gram of a nonylphenol ethoxylate with 30 EO units (Tergitol NP-30) and 1.62 gram of a secondary C11-C15-alcohol ethoxylate with 7 EO units (Tergitol 15-S-7) and 40 g of the following composition: 100 parts per weight (pw) of a vinyl end-stopped polydimethylsiloxane of around 250 mPa·s at 25° C. (vinyl content=0.22 mmol/g (about 1.6 mol-%)) of the general formula M$^{vi}_2$-D$_{120}$ as component (A), 5.5 parts of a polymethylhydrogensiloxane of the formula Me$_3$SiO(Me$_2$SiO)$_{15}$(MeHSiO)$_{30}$SiMe$_3$ having a viscosity of 30 mPa·s at 25° C. as component (B) providing a molar SiH/SiVi ratio of 2.5 in the components (A) and (B), 0.4 pw of an inhibitor as component (D), which is diallyl maleate.

The emulsion was made by incorporation of the reactive silicone-based composition into the water-phase in two minutes while mixing with an Ultra-Turrax high shear mixer at highest speed (4000 rpm) in a 1500 ml beaker of 14 cm height. During this mixing time the temperature of the emulsion rose to a maximum of 36° C. The amount of solids in the end-emulsion was 42 wt.-%+/−2 wt.-%.

Example 11 (Comparative Example)

'Two-Part'-Emulsion with Non-Ionic Emulsifiers—'Catalyst'—Emulsion)

60 g of a water phase contained 0.67 gram of a nonylphenol ethoxylate with 30 EO units (Tergitol NP-30) and 1.62 gram of a secondary C11-C15-alcohol ethoxylate with 7 EO units (Tergitol 15-S-7) and 40 g of the following composition: 100 parts per weight (pw) of a vinyl end-stopped polydimethylsiloxane of around 250 mPa·s at 25° C. (vinyl content=0.22 mmol/g (about 1.6 mol-%)) of the general formula M$^{vi}_2$-D$_{120}$ as component (A), and a Pt$^0$-complex having vinylsiloxane ligands (Pt-Karstedt catalyst) providing 1000 ppm of platinum related to (A).

The emulsion was made by incorporation of the reactive silicone-based composition into the water-phase in two minutes while mixing with an Ultra-Turrax high shear mixer at highest speed (4000 rpm) in a 1500 ml beaker of 14 cm height. During this mixing time the temperature of the emulsion rose to a maximum of 36° C. The amount of solids in the end-emulsion was 42 wt.-%+/−2 wt.-%.

Example 12

(Coating Procedure and Results)

The aqueous emulsions prepared in the examples 10 and 11 were mixed in a ratio of 18:2 to make a reactive emulsion mixture.

This aqueous reactive emulsion mixture and the aqueous reactive emulsion prepared in the example 9 and 3 were coated with an adjusted Mayer Bar on a standard glassine paper from Tervasaari, a Honey glassine paper of 60 g/m$^2$. The curing time of the aqueous coating was completed at 120° C. in less than 30 seconds. The dry coat weight determined after curing was measured to be 1 g/m$^2$. The Rubb-Off of the dry coating was determined by rubbing with certain pressure (1 N) on the coating with a finger and observing for the absence of haze in the coating and the appearance of small cured silicone particles.

The emulsions were stored at 40° C. for 1 hour after which another coating was made on paper. This coating procedure was repeated every hour.

The inventive one-part emulsion of example 3 and the two-part combination of the comparative emulsions made in example 10 and 11 showed good anchorage, less rubb-off even after a bath life of 3 hrs at 40° C. However, the comparative one-part emulsion made with non-ionic emulsifiers from example 9 failed the anchorage test after even a short bath life.

| Example | 3 | 9 | 10/11 |
|---|---|---|---|
| Anchorage initial | OK | OK | OK |
| Anchorage 1 hr 40° C. | OK | not OK | OK |
| Anchorage 2 hr 40° C. | OK | not OK | OK |
| Anchorage 3 hr 40° C. | OK | not OK | OK |

These examples show that a One-Part in-line emulsion, which can be coated with a good anchorage, less rubb-off on paper can only be made with the inventive emulsions.

Example 13 (Comparative Example)

(Combining Step i) and ii)

300 grams of a water phase contained that much of polyvinyl alcohol (PVA) as component (F) to provide an amount of 2 wt.-% of PVA in the final emulsion was mixed with an Ultra-Turrax high shear mixer at highest speed (4000 rpm) in a 1500 ml beaker of 14 cm height. The PVA-type in this example is Celvol® 540, a partially hydrolysed PV-Acetate having a degree of hydrolysis of 88 mol. % and a viscosity of 50 mPa·s at 25° C. (4 wt.-% aqueous solution). During the mixing subsequently was added into the beaker 180 g of a vinyl end-stopped polydimethylsiloxane of around 250 mPa·s at 25° C. (vinyl content=0.22 mmol/g (about 1.6 mol-%)) of the general formula $M^{vi}_2$-$D_{120}$ as component (A), 0.8 g of an inhibitor as component (D), which is diallyl maleate, 6.56 g of a polymethylhydrogensiloxane of the formula $Me_3SiO$ $(Me_2SiO)_{15}(MeHSiO)_{30}SiMe_3$ having a viscosity of 30 mPa·s at 25° C. as component (B) providing a molar SiH:SiVi ratio of 1.5:1 in the components (A) and (B) and 20 g of a 1000 ppm Pt containing (Pt-Karstedt catalyst) mixture of a vinyl end-stopped polydimethylsiloxane of around 250 mPa·s at 25° C. as described above as component (A), providing 100 ppm of platinum related to (A) and (B) as component (C). This mix was stirred with the Ultra-Turrax high shear mixer at highest speed (4000 rpm) for another 2 minutes. During this mixing time the temperature of the emulsion rose to a maximum of 36° C. The amount of solids in the end-emulsion was 42 wt.-%+/−2 wt.-%.

The aqueous emulsion prepared in this example is coated with a Mayer Bar on a standard glassine paper from Tervasaari Honey glassine paper of 60 g/m². The curing time of the aqueous coating was completed at 120° C. in less than 30 sec. The dry coat weight determined after curing was measured to be 1 g/m².

The Tesa tapes 7476 and 7475 were affixed to the cured silicone surface obtained before (acc. to Finat test No. 3), and the taped release liners were aged for 24 hours at room temperature. The force required to peel away the Tesa tape from the silicone surface through an angle of 180° at 300 mm/min was determined in cN/inch (Tesa® tapes have a width of 1 inch). The results are given below.

TABLE 2

| Example | Cure)* (s) | Release Tesa 7476 (cN/inch) | Release Tesa 7475 (cN/inch) |
|---|---|---|---|
| 13 | 30 | 308 | 642 |

)*cure defined as smear- and migration-free (versus Tesa 4154 tape) on the silicone coating.

The example 13 shows the properties of a release film made by a process, wherein the steps i) and ii), i.e. mixing the oil-phase and making the emulsion are carried out in the same time. The performance of the release coat of example 13 in terms of the release forces is not satisfactory. A release value of higher than 200 cN/inch is less preferred.

The invention claimed is:

1. A method of coating paper substrates comprising the steps of:
   (i) mixing components to form a reactive water-free silicone-based composition,
   (ii) mixing said reactive water-free silicone-based composition with water to form the aqueous emulsion of said reactive silicone-based composition,
   (iii) coating the paper substrate with said aqueous emulsion of said reactive silicone-based composition, and
   (iv) curing said reactive silicone-based composition on said paper substrate to form said silicone-coated paper substrate
   wherein the residence time in mixing step (i) is less than the bath-life time of reactive silicone-based composition, and
   step (ii) requires that the reactive silicone-based composition obtained in step (i) is fed into an emulsification unit for carrying out step (ii) before the end of the bath-life time of the reactive silicone-based composition
   wherein step (i) comprises mixing:
      (a) one or more polyorganosiloxanes having in average at least two alkenyl groups, with a viscosity of 40 to 400,000 mPa·s at 25° C. at a shear rate of D=1 s$^{-1}$ and a concentration of the alkenyl groups of 0.15 to 3.9 mol.-%,
      (b) one or more polyorganosiloxanes having in average at least two SiH groups, whereby the molar ratio of the SiH- to the Si-alkenyl-groups is between 0.7 and 10,
      (c) one or more hydrosilylation catalysts,
      (d) optionally one or more inhibitors of the hydrosilylation reaction, and
      (e) optionally one or more auxiliary agents.

2. The method of claim 1, wherein in step (ii) at least a portion of the water is fed into the emulsification unit before, simultaneously and/or after feeding the reactive silicone-based composition obtained in step (i) into an emulsification unit.

3. The method of claim 1, wherein at least one emulsifier is added in at least one of step (i) and step (ii).

4. The method of claim 3, wherein the at least one emulsifier is a polymeric material which is selected from polyvinylalcohols, polyvinylesters, or partially hydrolyzed polyvinylesters or copolymers thereof.

5. The method of claim 1, wherein the weight of the water fed in step (ii) is greater than the weight of the reactive silicone-based composition fed in step (ii).

6. The method of claim 1, wherein in step (ii) a shear energy is applied.

7. The method of claim 1, wherein step (iii) is carried out with at least one transfer unit selected from the group consisting of multi-roll systems to apply the aqueous emulsion of said reactive silicone-based composition onto said paper substrate.

8. The method of claim 1, wherein in step (iii) the aqueous emulsion is applied to the substrate in an amount of 0.1 to 10 g siloxane per m² of said substrate, measured and calculated by FINAT method No. 7.

9. The method of claim 1, wherein said curing step in step (iv) is carried out by passing the coated paper substrate, optionally after a water separation step, through at least one curing unit.

10. The method of claim 1, wherein the silicone-coated substrate made in step (iv) is collected by winding it on a winding roll which is operated with a band speed of 50 to 1000 meters per minute.

11. The method of claim 1, wherein said curing in said curing step (iv) is carried out by heating in a heating tunnel having an air temperature in the range of 80 to 300° C.

12. The method of claim 1, wherein the curing in step (iv) is carried out by irradiating with light of a wavelength in the range of 190 to 500 nm, optionally at an elevated temperature.

* * * * *